United States Patent
Nihey et al.

(10) Patent No.: US 12,215,027 B2
(45) Date of Patent: Feb. 4, 2025

(54) NANOCARBON SEPARATION METHOD AND NANOCARBON SEPARATION APPARATUS

(71) Applicant: NEC CORPORATION, Tokyo (JP)

(72) Inventors: Fumiyuki Nihey, Tokyo (JP); Hideaki Numata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1269 days.

(21) Appl. No.: 16/647,142

(22) PCT Filed: Sep. 29, 2017

(86) PCT No.: PCT/JP2017/035517
§ 371 (c)(1),
(2) Date: Mar. 13, 2020

(87) PCT Pub. No.: WO2019/064499
PCT Pub. Date: Apr. 4, 2019

(65) Prior Publication Data
US 2020/0277194 A1    Sep. 3, 2020

(51) Int. Cl.
| | | |
|---|---|---|
| B32B 9/00 | (2006.01) | |
| B01D 57/02 | (2006.01) | |
| C01B 32/159 | (2017.01) | |
| C01B 32/172 | (2017.01) | |

(52) U.S. Cl.
CPC ............ *C01B 32/172* (2017.08); *B01D 57/02* (2013.01); *C01B 32/159* (2017.08); *C01B 2202/22* (2013.01); *Y10T 428/30* (2015.01)

(58) Field of Classification Search
CPC . C01B 32/172; C01B 32/159; C01B 2202/22; B01D 57/02; Y10T 428/30

USPC .......................................................... 428/408
See application file for complete search history.

(56) References Cited

U.S. PATENT DOCUMENTS

| | | | |
|---|---|---|---|
| 8,697,026 B2 * | 4/2014 | Tanaka ................. | B82Y 40/00 423/445 B |
| 2012/0103809 A1 | 5/2012 | Ihara et al. | |
| 2013/0048949 A1 * | 2/2013 | Xia .................... | H01L 51/0537 977/734 |

FOREIGN PATENT DOCUMENTS

| | | |
|---|---|---|
| JP | 2005-527455 A | 9/2005 |
| JP | 2008-055375 A | 3/2008 |
| JP | 2008-266112 A | 11/2008 |
| JP | 2014-060158 A | 4/2014 |
| WO | 2008/143281 A1 | 11/2008 |
| WO | 2010/150808 A1 | 12/2010 |

OTHER PUBLICATIONS

International Search Report of PCT/JP2017/035517 dated Oct. 31, 2017 [PCT/ISA/210].

\* cited by examiner

*Primary Examiner* — Daniel H Miller
(74) *Attorney, Agent, or Firm* — Sughrue Mion, PLLC

(57) ABSTRACT

A nanocarbon separation method includes: preparing a nanocarbon dispersion liquid in which nanocarbons and a nonionic surfactant are dispersed in a solvent; injecting the nanocarbon dispersion liquid into a separation tank; applying a direct current voltage to a first electrode provided at an upper part of the interior of the separation tank and a second electrode provided at a lower part of the interior of the separation tank and generating a pH gradient in the nanocarbon dispersion liquid inside the separation tank, and separating metallic nanocarbons and semiconductor nanocarbons included in the nanocarbon dispersion liquid.

12 Claims, 12 Drawing Sheets

NANOCARBON SEPARATION METHOD AND NANOCARBON SEPARATION APPARATUS

CROSS REFERENCE TO RELATED APPLICATIONS

This application is a National Stage of International Application No. PCT/JP2017/035517, filed Sep. 29, 2017.

TECHNICAL FIELD

The present invention relates to a nanocarbon separation method and a nanocarbon separation apparatus.

BACKGROUND ART

In recent years, carbon materials having a size in a nanometer range (hereinafter referred to as "nanocarbons") are expected to be applied to various fields due to their mechanical properties, electrical properties, chemical properties, and the like.

In the case of nanocarbons, nanocarbons with different properties are simultaneously produced in a manufacturing stage in some cases. When nanocarbons with different electrical characteristics are used in an electronic material when mixed together, a problem such as the deterioration in the characteristics thereof is likely to be caused. Thus, it is necessary to separate nanocarbons with different properties.

In order to separate nanocarbons, Patent Document 1 describes a nanocarbon material separation method which includes: a step of introducing and arranging a dispersion solution including nanocarbon materials dispersed in nanocarbon micelle groups having a plurality of different charges and introducing a holding solution having a specific gravity different from that of the nanocarbon materials into an electrophoresis tank by laminating the solutions by disposing them in a predetermined direction; and a step of separating the nanocarbon micelle groups into two or more nanocarbon micelle groups by applying a voltage in a serial direction to the introduced, arranged, and laminated dispersion liquid and holding solution.

PRIOR ART DOCUMENTS

Patent Documents

[Patent Document 1] PCT International Publication No. WO 2010/150808

SUMMARY OF THE INVENTION

Problem to be Solved by the Invention

However, although the separation method described in Patent Document 1 can separate nanocarbons, there is a problem in the efficiency of separation. That is to say, the separation method described in Patent Document 1 requires time for separation.

An object of the present invention is to provide a nanocarbon separation method and a nanocarbon separation apparatus which reduce the time required for separation when nanocarbons having different properties are separated.

Means for Solving the Problem

A nanocarbon separation method of the present invention includes: a step of preparing a nanocarbon dispersion liquid in which nanocarbons and a non-ionic surfactant are dispersed in a solvent; a step of injecting the nanocarbon dispersion liquid into a separation tank; a step of applying a direct current voltage to a first electrode provided at an upper part of the interior of the separation tank and a second electrode provided at a lower part of the interior of the separation tank and generating a pH gradient in the nanocarbon dispersion liquid inside the separation tank; and a step of separating metallic nanocarbons and semiconductor nanocarbons included in the nanocarbon dispersion liquid.

A nanocarbon separation apparatus of the present invention is a nanocarbon separation apparatus used for separation of metallic nanocarbons and semiconductor nanocarbons included in a nanocarbon dispersion liquid in which nanocarbons and a non-ionic surfactant are dispersed in a solvent, the nanocarbon separation apparatus including: a separation tank which is configured to accommodate the nanocarbon dispersion liquid; and electrode members disposed inside the separation tank, wherein the separation tank has a lower end having an injection/recovery port communicating with an outer bottom surface of the separation tank, the electrode member includes a cylindrical member, a columnar member inserted into the cylindrical member, a first electrode provided on an outer circumferential surface of an upper end portion of the cylindrical member and a second electrode provided on a lower end portion of the columnar member, the columnar member is capable of moving in a height direction of the separation tank in a state being inserted into the cylindrical member, and a lower end of the columnar member includes a fitting member configured to inscribe in a lower end portion of the cylindrical member when the columnar member moves upward in the height direction of the separation tank.

Effect of the Invention

According to the present invention, it is possible to improve separation efficiency when nanocarbons having different properties are separated. Alternatively, according to the present invention, it is possible to shorten the time required for separation when nanocarbons having different properties are separated.

EMBODIMENTS FOR CARRYING OUT THE INVENTION

Example embodiments of a nanocarbon separation method and a nanocarbon separation apparatus according to the present invention will be described.

These example embodiments are specifically described to make the gist of the invention better understood and are not intended to limit the present invention unless otherwise stated.

First Example Embodiment (Nanocarbon Separation Apparatus)

Figure 1:
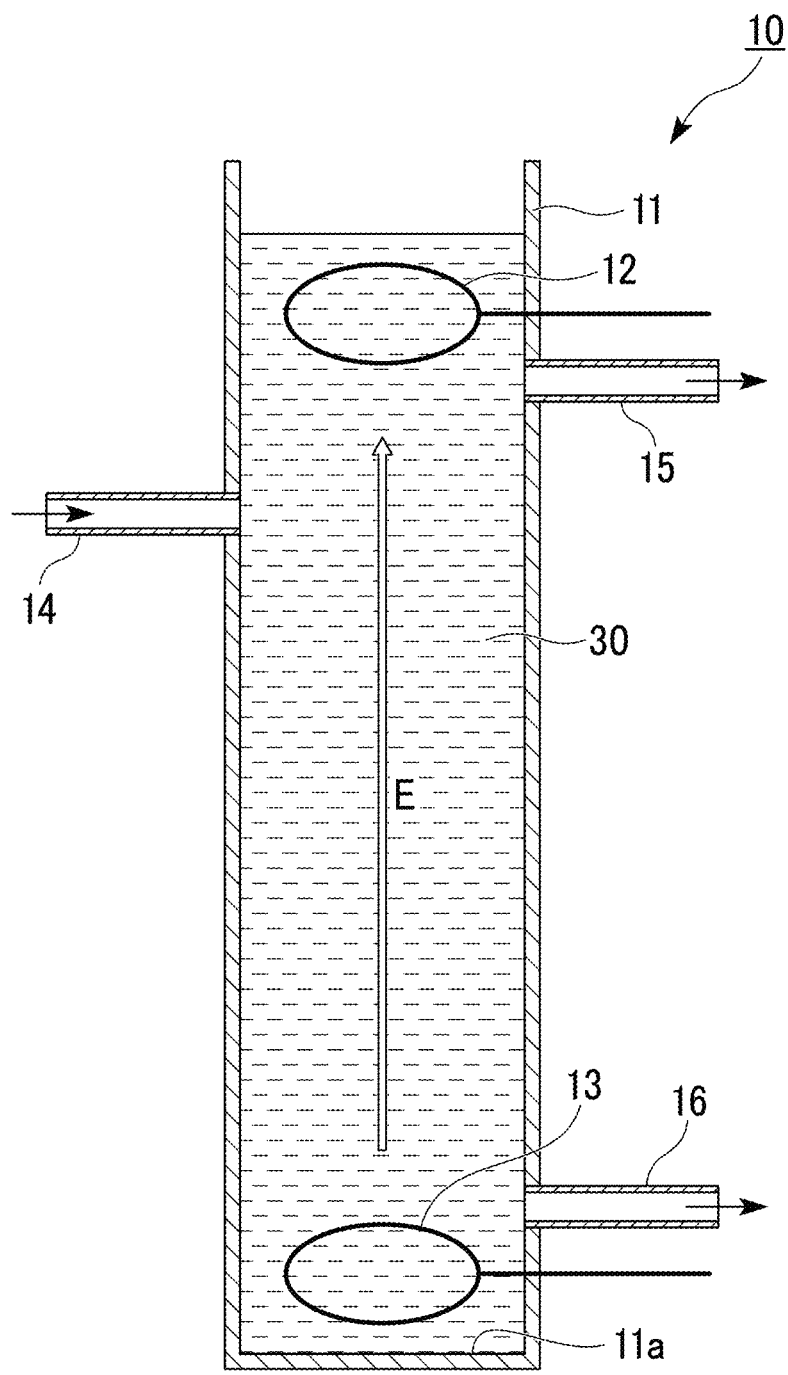
FIG. 1 is a schematic diagram showing a nanocarbon separation apparatus used in a nanocarbon separation method according to a first example embodiment.

FIG. 1 is a schematic diagram showing a nanocarbon separation apparatus used in a nanocarbon separation method in this example embodiment.

A nanocarbon separation apparatus 10 in this example embodiment includes a separation tank (an electrophoresis tank) 11 having an I-shaped structure (a vertical type structure), a first electrode 12 provided at an upper part of the interior of the separation tank 11, a second electrode 13 provided at a lower part of the interior of the separation tank 11, an injection port 14 through which a nanocarbon dispersion liquid 30 is injected into the separation tank 11, a first recovery port 15 which recovers the nanocarbon dispersion liquid 30 from the separation tank 11, and a second recovery port 16 which recovers the nanocarbon dispersion liquid 30 from the separation tank 11.

The first electrode 12 is disposed at an upper part of the separation tank 11 in a height direction thereof inside the separation tank 11 (a region above half a height of the separation tank 11 inside the separation tank 11).

The second electrode 13 is disposed at lower part of the separation tank 11 in the height direction thereof inside the separation tank 11 (a region below half a height of the separation tank 11 inside the separation tank 11).

In the nanocarbon separation apparatus 10 in this example embodiment, the first electrode 12 is a negative electrode and the second electrode 13 is the positive electrode. In this case, if a direct current (DC) voltage is applied to the first electrode 12 and the second electrode 13, an electric field E is directed from the bottom to the top of the separation tank 11 as shown in FIG. 1.

The first recovery port 15 is provided in the vicinity of the first electrode 12. That is to say, the first recovery port 15 is provided at an upper part of the separation tank 11 in the height direction thereof in the separation tank 11 (a region above half the height of the separation tank 11 in the separation tank 11).

The second recovery port 16 is provided in the vicinity of the second electrode 13. That is to say, the second recovery port 16 is provided at a lower part of the separation tank 11 in the height direction thereof in the separation tank 11 (a region below half the height of the separation tank 11 in the separation tank 11).

The injection port 14 is provided at an upper part of the separation tank 11 in the height direction thereof in the separation tank 11 (a region above half the height of the separation tank 11 in the separation tank 11) and below the first recovery port 15.

The separation tank 11 has a space in which the nanocarbon dispersion liquid 30 can be accommodated. The separation tank 11 accommodates the nanocarbon dispersion liquid 30 to be separated and separates a nanocarbon mixture using carrier-free electrophoresis. A shape and a size of the separation tank 11 are not particularly limited as long as the separation tank 11 can accommodate the nanocarbon dispersion liquid 30.

A material of the separation tank 11 is not particularly limited as long as the material is stable with respect to the nanocarbon dispersion liquid 30 and is an insulating material. Examples for the separation tank 11 include glass, quartz, an acrylic resin, and the like.

The first electrode 12 and the second electrode 13 are not particularly limited as long as the electrodes can be used for carrier-free electrophoresis and are stable with respect to the nanocarbon dispersion liquid 30. Examples of the first electrode 12 and the second electrode 13 include a platinum electrode and the like.

Although a constitution having the injection port 14 and the first recovery port 15 has been provided as an exemplary example of the case of the nanocarbon separation apparatus 10 in this example embodiment, the nanocarbon separation apparatus 10 in this example embodiment is not limited thereto. In the nanocarbon separation apparatus 10 in this example embodiment, the injection port 14 may also serve as the first recovery port 15. Furthermore, the injection port 14, the first recovery port 15, and the second recovery port 16 are not provided and the nanocarbon dispersion liquid 30 may be injected and recovered using another method, for example, a Pasteur pipette.

Also, although a case in which the first electrode 12 is a negative electrode and the second electrode 13 is a positive electrode has been provided as an exemplary example of the nanocarbon separation apparatus 10 in this example embodiment, the nanocarbon separation apparatus 10 in this example embodiment is not limited thereto. In the nanocarbon separation apparatus 10 in this example embodiment, the first electrode 12 may be a positive electrode and the second electrode 13 may be a negative electrode. In this case, a direction of a pH gradient of the nanocarbon dispersion liquid 30 formed inside the separation tank 11 through carrier-free electrophoresis is opposite to that of an example embodiment which will be described later.

Furthermore, in the nanocarbon separation method using the nanocarbon separation apparatus 10 which will be described later, if a temperature gradient occurs inside the separation tank 11, a convection phenomenon of the nanocarbon dispersion liquid 30 occurs inside the separation tank 11 in some cases. As a result, it is not possible to stably separate metallic nanocarbons and semiconductor nanocarbons contained in the nanocarbon dispersion liquid 30. Thus, it is desirable that the nanocarbon separation apparatus 10 include a temperature adjusting means for keeping a temperature of the nanocarbon dispersion liquid 30 inside the separation tank 11 constant. The temperature adjusting means is not particularly limited and can be any means, for example, installation or the like of a water-cooling jacket can be used as long as a temperature of a liquid accommodated inside a container can be kept constant.

According to the nanocarbon separation apparatus 10 for the nanocarbons in this example embodiment, for example, it is possible to perform the nanocarbon separation method which will be described later and it is possible to generate a pH gradient in the nanocarbon dispersion liquid 30 in which the nanocarbons and the non-ionic surfactant are dispersed in the solvent and which has been accommodated inside the separation tank 11. Furthermore, according to the nanocarbon separation apparatus 10 for the nanocarbons in this example embodiment, for example, it is possible to perform the nanocarbon separation method which will be described later and it is possible to increase the amount of metallic nanocarbons in the vicinity of the first electrode 12 which is a positive electrode and to increase the amount of semiconductor nanocarbons in the vicinity of the second electrode 13 which is a negative electrode. Thus, it is possible stably separate the metallic nanocarbons and the semiconductor nanocarbons. As a result, it is possible to obtain metallic nanocarbons and semiconductor nanocarbons having a high purity. Furthermore, according to the nanocarbon separation apparatus 10 in this example embodiment, since the nanocarbon dispersion liquid 30 contains the non-ionic surfactant, in carrier-free electrophoresis, it is possible to reduce an amount of current flowing through the nanocarbon dispersion liquid 30 and it is possible to minimize the amount of heat generated in the nanocarbon dispersion liquid 30.

(Nanocarbon Separation Method)

Figure 2:
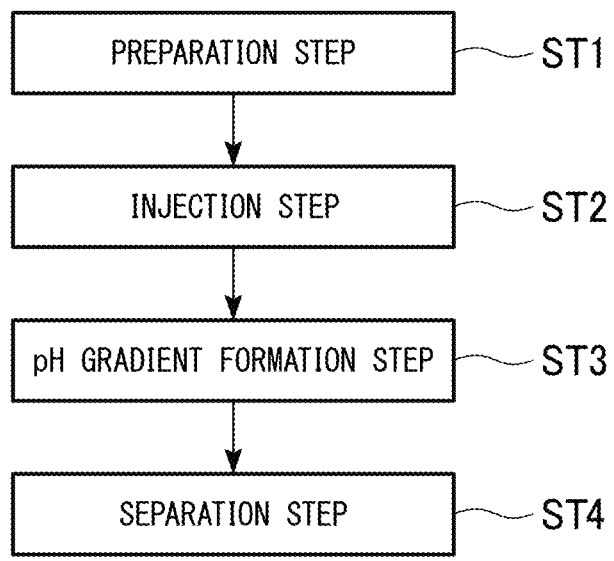
FIG. 2 is a flowchart showing the nanocarbon separation method according to the first example embodiment.

The nanocarbon separation method using the nanocarbon separation apparatus 10 will be described and an action of the nanocarbon separation apparatus 10 will be described with reference to FIGS. 1 and 2. FIG. 2 is a flowchart showing the separation method in this example embodiment.

The nanocarbon separation method in this example embodiment includes a step of preparing the nanocarbon dispersion liquid 30 in which the nanocarbons and the non-ionic surfactant are dispersed in the solvent (hereinafter referred to as a "preparation step"), a step of injecting the nanocarbon dispersion liquid 30 into the separation tank 11 (hereinafter referred to as an "injection step"), a step of applying the DC voltage to the first electrode 12 and the second electrode 13 and generating the pH gradient in the nanocarbon dispersion liquid 30 inside the separation tank 11 (hereinafter referred to as a "pH gradient formation step"), and a step of separating the metallic nanocarbons and the semiconductor nanocarbons contained in the nanocarbon dispersion liquid 30 (hereinafter referred to as a "separation step").

In the nanocarbon separation method in this example embodiment, nanocarbons refer to carbon materials mainly composed of carbon such as single-walled carbon nanotubes, double-walled carbon nanotubes, multi-walled carbon nanotubes, carbon nanohorns, carbon nanotwists, graphenes, and fullerenes. In the nanocarbon separation method in this example embodiment, a case in which a semiconductor type single-walled carbon nanotube and a metallic type single-walled carbon nanotube are separated from the nanocarbon dispersion liquid 30 containing single-walled carbon nanotubes as nanocarbons will be described in detail.

It is known that single-walled carbon nanotubes are divided into single-walled carbon nanotubes having two different properties, i.e., metallic type single-walled carbon nanotubes and semiconductor type single-walled carbon nanotubes in accordance with diameters of tubes and a winding method. If single-walled carbon nanotubes are synthesized using conventional manufacturing methods, single-walled carbon nanotube mixtures containing metallic type single-walled carbon nanotubes having metallic properties and semiconductor type single-walled carbon nanotubes having semiconductive properties in a statistical ratio of 1:2 are obtained.

The single-walled carbon nanotube mixtures are not particularly limited as long as the single-walled carbon nanotube mixtures contain a metallic type single-walled carbon nanotube and a semiconductor type single-walled carbon nanotube. Furthermore, the single-walled carbon nanotubes in this example embodiment may be single-walled carbon nanotubes alone and may be single-walled carbon nanotubes in which carbon is partially substituted with an arbitrary functional group or single-walled carbon nanotubes modified with an arbitrary functional group.

In the nanocarbon separation method in this example embodiment, the nanocarbon mixture contains metallic nanocarbons and semiconductor nanocarbons.

First, in the preparation step, the nanocarbon dispersion liquid 30 in which the nanocarbon mixture is dispersed in a dispersion medium together with a non-ionic surfactant is prepared.

The dispersion medium is not particularly limited as long as the dispersion medium can disperse a nanocarbon mixture. Examples of the dispersion medium include water, heavy water, organic solvents, ionic solutions, and the like. Among these dispersion mediums, it is desirable that water or heavy water be used because in this case the quality of nanocarbons does not change.

As the non-ionic surfactant, non-ionic surfactants having a hydrophilic site in which ionization does not occur and a hydrophobic site such as an alkyl chain are used. Examples of such non-ionic surfactants include non-ionic surfactants having a polyethylene glycol structure represented by a polyoxyethylene alkyl ether type.

As such non-ionic surfactants, it is desirable that a polyoxyethylene alkyl ether represented by the following Expression (1) be used:

$$C_nH_{2n}(OCH_2CH_2)_mOH \qquad (1)$$

(where, n=12 to 18 and m=20 to 100).

Examples of the polyoxyethylene alkyl ether represented by the foregoing Expression (1) include polyoxyethylene (23) lauryl ether (trade name: Brij L23; manufactured by Sigma-Aldrich), polyoxyethylene (20) cetyl ether (trade name: Brij C20; manufactured by Sigma-Aldrich), polyoxyethylene (20) stearyl ether (trade name: Brij S20; manufactured by Sigma-Aldrich), polyoxyethylene (20) oleyl ether (trade name: Brij O20; manufactured by Sigma-Aldrich), polyoxyethylene (100) stearyl ether (trade name: Brij S100; manufactured by Sigma-Aldrich), and the like.

As the non-ionic surfactant, polyoxyethylene sorbitan monostearate (molecular expression: $C_{64}H_{126}O_{26}$; trade name: Tween 60; manufactured by Sigma-Aldrich), polyoxyethylene sorbitan trioleate (molecular expression: $C_{24}H_{44}O_6$; trade name: Tween 85; manufactured by Sigma-Aldrich), octylphenol ethoxylate (molecular expression: $C_{14}H_{22}O(C_2H_4O)_n$; n=1 to 10; trade name: Triton X-100; manufactured by Sigma-Aldrich), polyoxyethylene (40) isooctyl phenyl ether (molecular expression: $C_8H_{17}C_6H_4O$ ($CH_2CH_2O)_{40}H$; trade name: Triton X-405; manufactured by Sigma-Aldrich), poloxamer (molecular expression: $C_5H_{10}O_2$; trade name: Pluronic; manufactured by Sigma-Aldrich), polyvinylpyrrolidone (molecular expression: $(C_6H_9NO)_n$; n=5 to 100; manufactured by Sigma-Aldrich), and the like can also be used.

The amount of the non-ionic surfactant in the nanocarbon dispersion liquid 30 is preferably 0.1 wt % or more and 5 wt % or less, and more preferably 0.5 wt % or more and 2 wt % or less.

If the amount of the non-ionic surfactant is 0.1 wt % or more, it is possible to form a pH gradient of the nanocarbon dispersion liquid 30 inside the separation tank 11 through carrier-free electrophoresis. On the other hand, if the amount of non-ionic surfactants is 5 wt % or less, a viscosity of the nanocarbon dispersion liquid 30 does not excessively increase and it is possible to easily separate the metallic nanocarbons and the semiconductor nanocarbons contained in the nanocarbon dispersion liquid 30 through carrier-free electrophoresis.

The amount of nanocarbons in the nanocarbon dispersion liquid 30 is preferably 1 μg/mL or more and 100 μg/mL or less, and more preferably 5 μg/mL or more and 40 μg/mL or less.

If the amount of nanocarbons is in the above range, it is possible to easily separate the metallic nanocarbons and the semiconductor nanocarbons contained in the nanocarbon dispersion liquid 30 through carrier-free electrophoresis.

A method for preparing the nanocarbon dispersion liquid 30 is not particularly limited as long as a known method is used as the method. Examples of the method include a method for subjecting a mixed solution of a nanocarbon mixture and a dispersion medium containing a non-ionic surfactant to ultrasonic treatment to disperse the nanocarbon mixture in the dispersion medium. This ultrasonic treatment sufficiently separates aggregated mixtures of metallic nanocarbons and semiconductor nanocarbons and the nanocarbon dispersion liquid 30 is obtained by uniformly dispersing metallic nanocarbons and semiconductor nanocarbons in the dispersion medium. Therefore, the metallic nanocarbons and the semiconductor nanocarbons are easily separated through a carrier-free electrophoresis method which will be described later. It is desirable that metallic nanocarbons and semiconductor nanocarbons which have not been dispersed through ultrasonic treatment be separated and removed through ultracentrifugation.

Subsequently, in the injection step, the nanocarbon dispersion liquid 30 prepared in the preparation step is injected into the separation tank 11 through the injection port 14.

Subsequently, in the pH gradient formation step, a pH gradient is generated in the nanocarbon dispersion liquid 30 inside the separation tank 11 by applying a DC voltage to the first electrode 12 and the second electrode 13.

By applying a DC voltage to the first electrode 12 and the second electrode 13 for a predetermined time (for example, 1 to 24 hours), a pH gradient of the nanocarbon dispersion liquid 30 is formed inside the separation tank 11.

Subsequently, in the separation step, the metallic nanocarbons and the semiconductor nanocarbons contained in the nanocarbon dispersion liquid 30 are separated through the carrier-free electrophoresis method.

The nanocarbon mixture contained in the nanocarbon dispersion liquid 30 is separated into the metallic nanocarbons and the semiconductor nanocarbons in the separation step due to a resultant force of a moving force generated due to a pH gradient (a pH difference) formed in the pH gradient formation step in the nanocarbon dispersion liquid 30 inside the separation tank 11 and an electrophoretic force generated due to an electric field and charges.

If a DC voltage is applied to the first electrode 12 and the second electrode 13 in a state in which the nanocarbon dispersion liquid 30 has been accommodated inside the separation tank 11, in the nanocarbon dispersion liquid 30, a region having a pH of 6 to 7 is formed on the first electrode 12 (the negative electrode) side and a region having a pH of 4 to 5 is formed on the second electrode 13 (the positive electrode) side. A pH gradient in a direction of an electric field E generated in the separation tank 11 is formed in the nanocarbon dispersion liquid 30 by applying a DC voltage to the first electrode 12 and the second electrode 13. That is to say, the pH gradient in the nanocarbon dispersion liquid 30 is formed so that the pH increases from a lower side of the separation tank 11 toward an upper side thereof.

In the nanocarbon dispersion liquid 30 containing a non-ionic surfactant, the metallic nanocarbons have a positive charge and the semiconductor nanocarbons have a very weak negative charge.

Therefore, if a DC voltage is applied to the first electrode 12 and the second electrode 13, in the nanocarbon mixture contained in the nanocarbon dispersion liquid 30, the metallic nanocarbons move toward the first electrode 12 (the negative electrode) side and the semiconductor nanocarbons move toward the second electrode 13 (the positive electrode) side. As a result, the nanocarbon dispersion liquid 30 is phase-separated into three phases, i.e., a dispersion phase having a relatively high amount of metallic nanocarbons (hereinafter referred to as a "dispersion phase A"), a dispersion phase having a relatively high amount of semiconductor nanocarbons (hereinafter referred to as a "dispersion phase B"), and a dispersion phase formed between the dispersion phase A and the dispersion phase B and having a relatively low amount of metallic nanocarbons and semiconductor nanocarbons (hereinafter referred to as a "dispersion phase C").

In this example embodiment, the dispersion phase A is formed on the first electrode 12 side and the dispersion phase B is formed on the second electrode 13 side.

A DC voltage applied to the first electrode 12 and the second electrode 13 is not particularly limited and is appropriately adjusted in accordance with a distance between the first electrode 12 and the second electrode 13, the amount of nanocarbon mixtures in the nanocarbon dispersion liquid 30, and the like.

When water or heavy water is used as the dispersion medium of the nanocarbon dispersion liquid 30, a DC voltage applied to the first electrode 12 and the second electrode 13 is set to an arbitrary value higher than 0 V and 1000 V or lower.

For example, when a distance between the first electrode 12 and the second electrode 13 (a distance between electrodes) is 30 cm, a DC voltage applied to the first electrode 12 and the second electrode 13 is preferably 15 V or higher and 450 V or lower, and more preferably 30 V or higher and 300 V or lower.

If a DC voltage applied to the first electrode 12 and the second electrode 13 is 15 V or higher, it is possible to form a pH gradient in the nanocarbon dispersion liquid 30 inside the separation tank 11 and separate the metallic nanocarbons and the semiconductor nanocarbons contained in the nanocarbon dispersion liquid 30. On the other hand, if a DC voltage applied to the first electrode 12 and the second electrode 13 is 450 V or lower, an influence of water or heavy water electrolysis can be minimized.

Also, when a DC voltage is applied to the first electrode 12 and the second electrode 13, an electric field between the first electrode 12 and the second electrode 13 is preferably 0.5 V/cm or higher and 15 V/cm or lower, and more preferably 1 V/cm or higher and 10 V/cm or lower.

If an electric field between the first electrode 12 and the second electrode 13 is 0.5 V/cm or higher, it is possible to form a pH gradient in the nanocarbon dispersion liquid 30 inside the separation tank 11 and separate the metallic nanocarbons and the semiconductor nanocarbons contained in the nanocarbon dispersion liquid 30. On the other hand, when an electric field between the first electrode 12 and the second electrode 13 is 15 V/cm or lower, an influence of water or heavy water electrolysis can be minimized.

Subsequently, the separated dispersion phase A and dispersion phase B are recovered (fractionated).

A recovery method is not particularly limited and any method may be used as long as the dispersion phase A and the dispersion phase B are not mixed in a diffusion manner.

Examples of the recovery method include a method in which application of a DC voltage to the first electrode 12 and the second electrode 13 is stopped and a small amount is gently suctioned out from each phase using a pipette.

Also, examples of the recovery method include a method in which the nanocarbon dispersion liquid 30 with the dispersion phase A is continuously suctioned out from the first recovery port 15 and the nanocarbon dispersion liquid 30 with the dispersion phase B is continuously suctioned out from the second recovery port 16 while a DC voltage is being applied to the first electrode 12 and the second electrode 13. This method uses the fact that the dispersion phase A having a high amount of metallic nanocarbons is formed in the vicinity of the first electrode 12 and the dispersion phase B having a high amount of semiconductor nanocarbons is formed in the vicinity of the second electrode 13.

When the recovered dispersion liquid is accommodated in the separation tank 11 again and an operation of separating the metallic nanocarbons and the semiconductor nanocarbons contained in the nanocarbon dispersion liquid 30 is repeatedly performed using the carrier-free electrophoresis method in the same manner as described above, it is possible to obtain metallic nanocarbons and semiconductor nanocarbons having higher purity.

It is possible to evaluate the separation efficiency for the recovered dispersion liquid using a technique such as micro-Raman spectroscopy (a change in Raman spectrum of a radial breathing mode (RBM) region and a change in Raman spectrum shape of a Breit-Wigner-Fano (BWF) region) and ultraviolet (UV)-visible near-absorptive spectrophotometry (a change in peak shape of an absorption spectrum). Furthermore, it is also possible to evaluate the separation efficiency for the dispersion liquid by evaluating the electrical characteristics of the nanocarbon. For example, it is possible to evaluate the separation efficiency for the dispersion liquid by preparing a field effect transistor and measuring the transistor characteristics thereof.

According to the nanocarbon separation method in this example embodiment, the amount of metallic nanocarbons increases in the vicinity of the first electrode 12 which is a positive electrode and the amount of semiconductor nanocarbons increases in the vicinity of the second electrode 13 which is a negative electrode. Thus, it is possible to stably separate the metallic nanocarbons and the semiconductor nanocarbons. As a result, it is possible to obtain metallic nanocarbons and semiconductor nanocarbons having high purity. Furthermore, according to the nanocarbon separation method in this example embodiment, the nanocarbon dispersion liquid 30 contains an non-ionic surfactant. Thus, in carrier-free electrophoresis, it is possible to reduce the amount of current flowing through the nanocarbon dispersion liquid 30 and it is possible to minimize the amount of heat generated in the nanocarbon dispersion liquid 30.

Although a case in which the nanocarbon mixture is separated into metallic nanocarbons and semiconductor nanocarbons has been provided as an exemplary example of the nanocarbon separation method in this example embodiment, the nanocarbon separation method in this example embodiment is not limited thereto. The nanocarbon separation method in this example embodiment may be performed as, for example, a nanocarbon purification method in which separation into metallic nanocarbons and semiconductor nanocarbons has been performed inside the separation tank 11 and only nanocarbons having target properties are recovered.

Second Example Embodiment (Nanocarbon Separation Apparatus)

Figure 3:
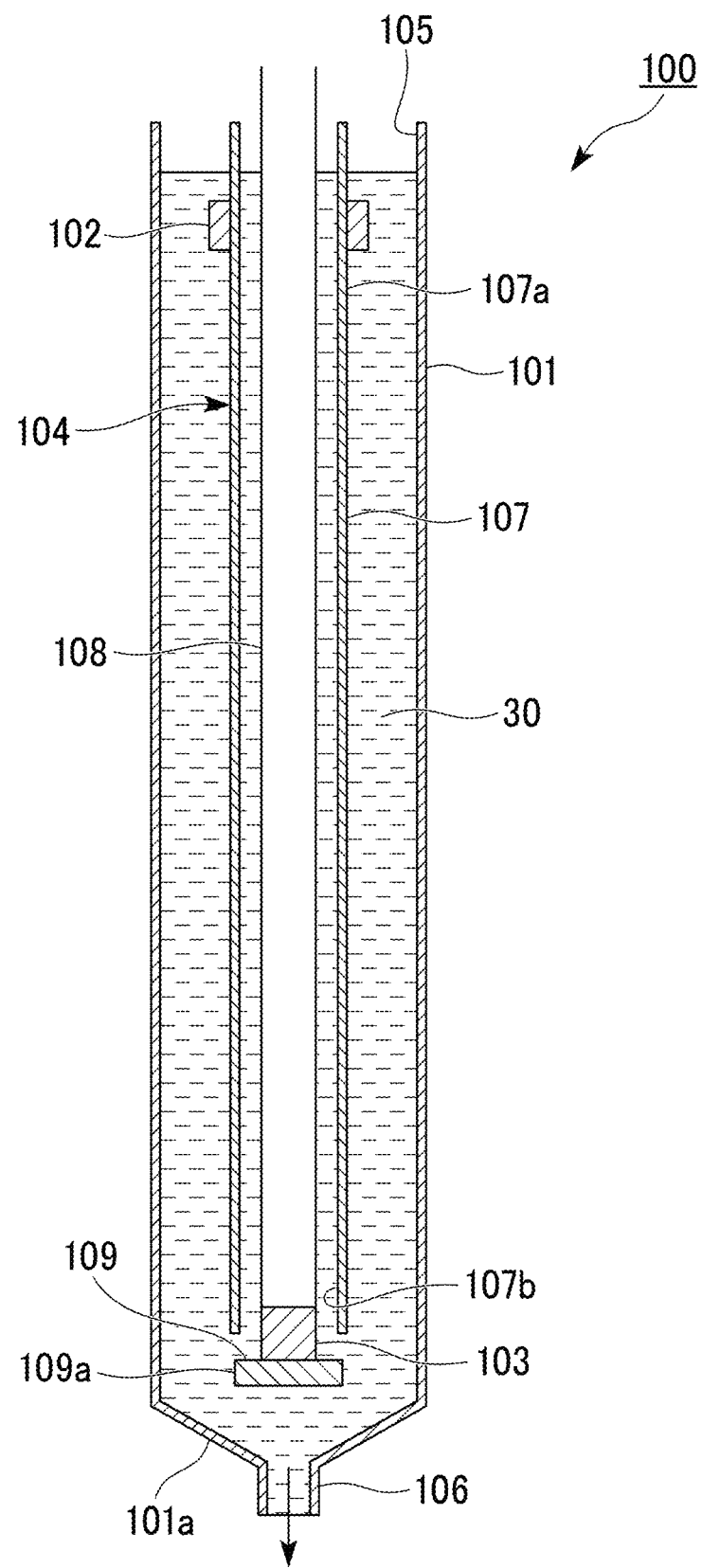
FIG. 3 is a schematic diagram showing a nanocarbon separation apparatus used in a nanocarbon separation method according to a second example embodiment.

FIG. 3 is a schematic diagram showing a nanocarbon separation apparatus used in a nanocarbon separation method in this example embodiment.

A nanocarbon separation apparatus 100 in this example embodiment includes a separation tank (an electrophoresis tank) 101 having an I-shaped structure (a vertical type structure) and an electrode member 104 which has a first electrode 102 provided at an upper part of the interior of a separation tank 101 and a second electrode 103 provided at a lower part of the interior of the separation tank 101.

The separation tank 101 has an upper end having an opening section 105. Furthermore, the separation tank 101 has a lower end having an injection/recovery port 106 communicating with an outer bottom surface 101a of the separation tank 101. The injection/recovery port 106 is used for injecting a nanocarbon dispersion liquid 30 into the separation tank 101 and recovering the nanocarbon dispersion liquid 30 from the separation tank 101. In addition, the injection/recovery port 106 has a sealing structure (not shown) such as a rotary cock having a ground glass joint.

When the nanocarbon dispersion liquid 30 is gently injected and recovered through the injection/recovery port 106 in a bottom portion of the separation tank 101 using, for example, a peristaltic pump or the like, it is possible to perform an injection/recovery operation without moving the injection/recovery port in accordance with a change in liquid level and disturbing a liquid phase interface inside the separation tank 101 at the time of injection/recovery. Furthermore, when the capacity of the separation tank 101 is increased, there is no need to prepare a long injection/recovery nozzle, which is very reasonable.

The electrode member 104 includes an insulating cylindrical member 107, an insulating columnar member 108 inserted into the cylindrical member 107, the first electrode 102 provided on an outer circumferential surface 107a of the cylindrical member 107, and the second electrode 103 provided on a lower end portion of the columnar member 108. Furthermore, the first electrode 102 is provided at an upper end portion of the cylindrical member 107. In the nanocarbon separation apparatus 100 in this example embodiment, the first electrode 102 is a negative electrode and the second electrode 103 is a positive electrode.

The cylindrical member 107 extends over substantially the entire area of the separation tank 101 in a height direction thereof.

The columnar member 108 extends over substantially the entire area of the separation tank 101 in the height direction thereof in a state of being inserted into the cylindrical member 107. Furthermore, the columnar member 108 is capable of moving in the height direction of the separation tank 101 in a state of being inserted into the cylindrical member 107. In addition, a plate-like fitting member 109 inscribed in a lower end portion of the cylindrical member 107 when the columnar member 108 moves upward in the height direction of the separation tank 101 is provided at a lower end of the columnar member 108. A side surface 109*a* of the fitting member 109 has a shape similar to that of an inner side surface 107*b* of the lower end portion of the cylindrical member 107. Thus, when the columnar member 108 moves upward in the height direction of the separation tank 101, the fitting member 109 can be inscribed and fitted to the lower end portion of the cylindrical member 107. On the other hand, when the columnar member 108 moves downward in the height direction of the separation tank 101, a gap can be provided between a lower end of the cylindrical member 107 and the fitting member 109. When metallic nanocarbons and semiconductor nanocarbons contained in the nanocarbon dispersion liquid 30 are separated through carrier-free electrophoresis, the gap is provided between the lower end of the cylindrical member 107 and the fitting member 109. In this state, if a DC voltage is applied to the first electrode 102 and the second electrode 103, a pH gradient is formed in the nanocarbon dispersion liquid 30 inside the separation tank 101. Even when the gap is provided between the lower end of the cylindrical member 107 and the fitting member 109, it is desirable that most of the second electrode 103 be arranged inside the cylindrical member 107.

Examples of a material of the separation tank 101 include the same as the material of the separation tank 11.

Examples of the first electrode 102 and the second electrode 103 include the same as the first electrode 12 and the second electrode 13.

Materials of the cylindrical member 107, the columnar member 108, and the fitting member 109 are not particularly limited as long as the materials are stable to the nanocarbon dispersion liquid 30 and insulating materials and examples thereof include glass, quartz, acrylic resins, and the like.

Although a case in which the first electrode 102 is the negative electrode and the second electrode 103 is the positive electrode has been provided as an exemplary example of the nanocarbon separation apparatus 100 in this example embodiment, the nanocarbon separation apparatus 100 in this example embodiment is not limited thereto. In the nanocarbon separation apparatus 100 in this example embodiment, the first electrode 102 may be a positive electrode and the second electrode 103 may be a negative electrode. In this case, the direction of a pH gradient of the nanocarbon dispersion liquid 30 formed inside the separation tank 101 through carrier-free electrophoresis is opposite to that of an example embodiment which will be described later.

Also, if a temperature gradient is generated inside the separation tank 101 in the nanocarbon separation method using the nanocarbon separation apparatus 100 which will be described later, a convection phenomenon in the nanocarbon dispersion liquid 30 occurs inside the separation tank 101 in some cases. As a result, the metallic nanocarbons and the semiconductor nanocarbons contained in the nanocarbon dispersion liquid 30 cannot be stably separated. Thus, it is desirable that the nanocarbon separation apparatus 100 include a temperature adjusting means for keeping a temperature of the nanocarbon dispersion liquid 30 inside the separation tank 101 constant. The temperature adjusting means is not particularly limited and can be any means, for example, installation of a water-cooling jacket or the like as long as the temperature adjusting means can keep a temperature of a liquid accommodated inside a container constant.

According to the nanocarbon separation apparatus 100 for the nanocarbons in this example embodiment, for example, it is possible to perform the nanocarbon separation method which will be described later and it is possible to generate a pH gradient in the nanocarbon dispersion liquid 30 in which the nanocarbons and the non-ionic surfactant are dispersed in the solvent and which is accommodated inside the separation tank 101. Furthermore, according to the nanocarbon separation apparatus 100 for the nanocarbons in this example embodiment, for example, it is possible to perform the nanocarbon separation method which will be described later and it is possible to increase the amount of metallic nanocarbons in the vicinity of the first electrode 102 which is a positive electrode and increase the amount of semiconductor nanocarbons in the vicinity of the second electrode 103 which is a negative electrode. Thus, it is possible to stably separate the metallic nanocarbons and the semiconductor nanocarbons. As a result, it is possible to obtain the metallic nanocarbons and the semiconductor nanocarbons having high purity. Furthermore, according to the nanocarbon separation apparatus 100 for the nanocarbons in this example embodiment, the nanocarbon dispersion liquid 30 contains the non-ionic surfactant. Thus, it is possible to reduce the amount of current flowing through the nanocarbon dispersion liquid 30 in carrier-free electrophoresis and it is possible to minimize the amount of heat generated in the nanocarbon dispersion liquid 30.

(Nanocarbon Separation Method)

The nanocarbon separation method using the nanocarbon separation apparatus 100 will be described and an action of the nanocarbon separation apparatus 100 will be described with reference to FIG. 3.

The nanocarbon separation method in this example embodiment includes a step of preparing the nanocarbon dispersion liquid 30 (the preparation step), a step of injecting the nanocarbon dispersion liquid 30 into the separation tank 101 (the injection step), a step of generating a pH gradient in the nanocarbon dispersion liquid 30 inside the separation tank 11 by applying a DC voltage to the first electrode 102 and the second electrode 103 (the pH gradient formation step), and a step of separating the metallic nanocarbons and the semiconductor nanocarbons contained in the nanocarbon dispersion liquid 30 (the separation step).

The preparation step and the injection step are performed in the same manner as in the first example embodiment. Furthermore, as described above, in the injection step in this example embodiment, it is also possible to inject the nanocarbon dispersion liquid 30 gently through the injection/recovery port 106 provided in a bottom portion of the separation tank 101 using, for example, a peristaltic pump or the like.

Subsequently, in the pH gradient formation step, a pH gradient is generated in the nanocarbon dispersion liquid 30 inside the separation tank 101 by applying a DC voltage to the first electrode 12 and the second electrode 13.

In the pH gradient formation step, when the columnar member 108 moves downward in the height direction of the separation tank 101, a DC voltage is applied to the first electrode 12 and the second electrode 13 in a state in which a gap is provided between the lower end of the cylindrical member 107 and the fitting member 109.

Subsequently, in the separation step, the metallic nanocarbons and the semiconductor nanocarbons contained in the nanocarbon dispersion liquid 30 are separated through the carrier-free electrophoresis method.

In the pH gradient formation step, the metallic nanocarbons and the semiconductor nanocarbons contained in the nanocarbon dispersion liquid 30 are separated through carrier-free electrophoresis in the same manner as in the first example embodiment in a state in which a pH gradient is formed in the nanocarbon dispersion liquid 30 inside the separation tank 101. As described above, even when a gap is provided between the lower end of the cylindrical member 107 and the fitting member 109, it is desirable that most of the second electrode 103 be arranged inside the cylindrical member 107.

If a DC voltage is applied to the first electrode 102 as a negative electrode and the second electrode 103 as a positive electrode, water or heavy water is subjected to electrolysis, hydrogen (deuterium) is generated in the first electrode 102 and oxygen is generated in the second electrode 103. If the oxygen generated in the second electrode 103 forms air bubbles and moves to an upper part of the separation tank 101, a convection phenomenon of the nanocarbon dispersion liquid 30 being separated occurs in some cases.

In the nanocarbon separation apparatus 100 in this example embodiment, a voltage for carrier-free electrophoresis is applied in a state in which a gap is provided between the lower end of the cylindrical member 107 and the fitting member 109. Oxygen generated through electrolysis in the second electrode 103 moves up inside the cylindrical member 107 and goes outside of the separation tank 101. In the nanocarbon separation method in this example embodiment, separation of the metallic nanocarbons and the semiconductor nanocarbons contained in the nanocarbon dispersion liquid 30 is mainly performed between the separation tank 101 and the cylindrical member 107. Therefore, according to the nanocarbon separation method in this example embodiment, it is possible to prevent a convection phenomenon of the nanocarbon dispersion liquid 30 being separated due to air bubbles formed by oxygen generated in the second electrode 103. Accordingly, disturbance of air bubbles generated due to electrolysis of water or heavy water is reduced, stable separation is performed, and accuracy of separation is improved compared to when the nanocarbon separation apparatus 10 used in the first example embodiment is used. Furthermore, it is possible to apply a higher voltage and perform separation faster and more stably.

Subsequently, the separated dispersion phase A and dispersion phase B are recovered (fractionated).

A recovery method is not particularly limited and any method may be used as long as the dispersion phase A and the dispersion phase B are not mixed in a diffusion manner.

Examples of the recovery method include a method in which application of a DC voltage to the first electrode 102 and the second electrode 103 is stopped, a rotary cock provided in the injection/recovery port 106 opens, a dispersion liquid with the dispersion phase A is slowly discharged from the bottom of the separation tank 101 using a peristaltic pump or the like, and this dispersion liquid is recovered. Subsequently, a dispersion liquid with the dispersion phase B is slowly discharged from the bottom of the separation tank 101 and this dispersion liquid is recovered.

It is possible to obtain the metallic nanocarbons and the semiconductor nanocarbons having high purity by accommodating the recovered dispersion liquids in the separation tank 101 again and repeatedly performing an operation in which the metallic nanocarbons and the semiconductor nanocarbons contained in the nanocarbon dispersion liquid 30 are separated through the carrier-free electrophoresis method in the same manner as described above.

The separation efficiency of the recovered dispersion liquid can be evaluated in the same manner as in the first example embodiment.

According to the nanocarbon separation method in this example embodiment, the amount of metallic nanocarbons increases in the vicinity of the first electrode 102 which is a negative electrode and the amount of semiconductor nanocarbons increases in the vicinity of the second electrode 103 which is a positive electrode. Thus, it is possible to stably separate the metallic nanocarbons and the semiconductor nanocarbons. As a result, it is possible to obtain the metallic nanocarbons and the semiconductor nanocarbons having high purity. Furthermore, according to the nanocarbon separation method in this example embodiment, the nanocarbon dispersion liquid 30 contains the non-ionic surfactant. Thus, in carrier-free electrophoresis, it is possible to reduce an amount of current flowing through the nanocarbon dispersion liquid 30 and it is possible to minimize the amount of heat generated in the nanocarbon dispersion liquid 30.

Although a case in which the nanocarbon mixture is separated into the metallic nanocarbons and the semiconductor nanocarbons has been provided as an exemplary example of the nanocarbon separation method in this example embodiment, the nanocarbon separation method in this example embodiment is not limited thereto. The nanocarbon separation method in this example embodiment may be performed, for example, as a nanocarbon purification method in which separation into the metallic nanocarbons and the semiconductor nanocarbons is performed inside the separation tank 101 and then only nanocarbons having target properties are recovered.

Also, when the first electrode 102 is a positive electrode and the second electrode 103 is a negative electrode, occurrence of a convection phenomenon of the nanocarbon dispersion liquid 30 being separated due to air bubbles formed by the hydrogen generated in the second electrode 103 can be prevented by moving up hydrogen generated through electrolysis in the second electrode 103 inside the cylindrical member 107 and discharging the hydrogen outside of the separation tank 101.

Although the example embodiment which can be applied to a case in which the nanocarbon mixture is separated into the metallic nanocarbons and the semiconductor nanocarbons has been described above, the present invention can also be applied when a multi-walled carbon nanotube mixture, a double-walled carbon nanotube mixture, a graphene mixture, or the like is separated.

WORKING EXAMPLES

Although the present invention will be described in more detail below through working examples, the present invention is not limited to the following working examples.

Working Example 1

"Preparation of Single-Walled Carbon Nanotube Dispersion Liquid"

Solution AA obtained by dissolving 1 wt % of polyoxyethylene (100) stearyl ether (trade name: Brij S100; manufactured by Sigma-Aldrich) which is a non-ionic surfactant in heavy water was prepared.

A single-walled carbon nanotube mixture (eDIPS (enhanced Direct Injection Pyrolytic Synthesis), single-walled carbon nanotube; average diameter: 1.3 nm) was put into the solution AA.

The single-walled carbon nanotube mixture is dispersed by subjecting the solution AA having the single-walled carbon nanotube mixture put therein to ultrasonic dispersion treatment at an output of 40 W for 20 minutes using a horn type ultrasonic crusher (trade name: Digital Sonifier 450; manufactured by Branson Ultrasonics). After that, an ultracentrifugation operation was performed using an ultracentrifuge (trade name: CS100GX; manufactured by Hitachi koki) at 250000×g and 10° C. for 1 hour. Furthermore, a supernatant corresponding to 80% of the single-walled carbon nanotube mixture was fractionated and a single-walled carbon nanotube dispersion liquid in which the amount of a single-walled carbon nanotube was 10 μg/mL and the amount of polyoxyethylene (100) stearyl ether was 1.0 wt % was obtained.

"Injection of Single-Walled Carbon Nanotube Dispersion Liquid"

The single-walled carbon nanotube dispersion liquid prepared as described above was injected into the separation tank 101 in the nanocarbon separation apparatus 100 shown in FIG. 3. A height of the single-walled carbon nanotube dispersion liquid injected into the separation tank 101 (a height from a bottom surface of the separation tank 101 to a liquid surface) was set to 25 cm.

"Separation Operation"

A DC voltage of 120 V was applied to the first electrode 102 (a negative electrode) and the second electrode 103 (a positive electrode) of the nanocarbon separation apparatus 100. A voltage application was stopped when a predetermined time had passed and the separation sufficiently advanced.

"Recovery Operation"

After the voltage application was completed, the single-walled carbon nanotube dispersion liquid was recovered from the upper part of the separation tank 101 so that 15 fractions were formed for each about 6 mL. The fractions was designated as F1, F2, . . . , and F15 from the second electrode 103 side (a lower part) of the separation tank 101.

"Evaluation"

(PH Measurement of Single-Walled Carbon Nanotube Dispersion Liquid)

A pH of a single-walled carbon nanotube dispersion liquid recovered from each fraction was measured using a pH meter (trade name: desktop type pH meter F-71; manufactured by HORIBA).

Figure 4:
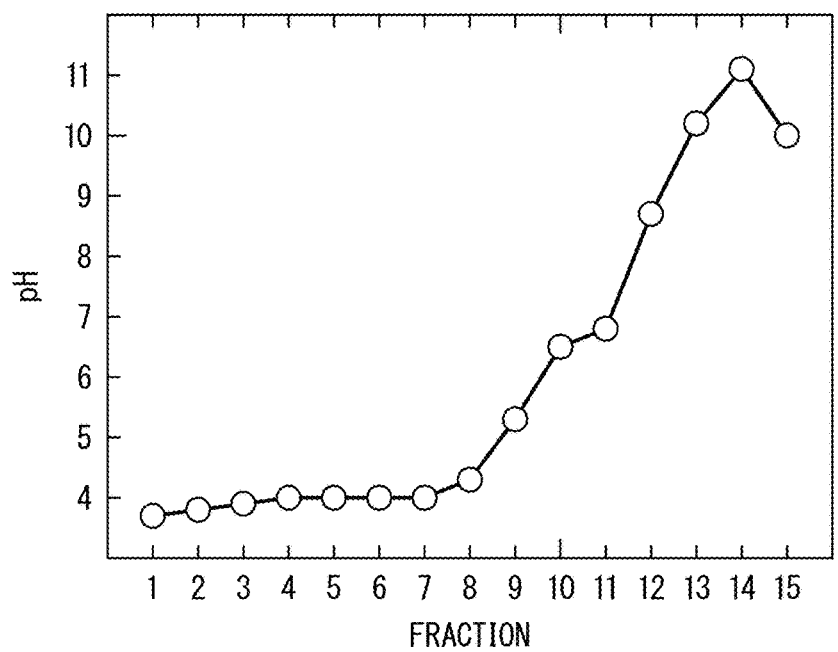
FIG. 4 is a diagram showing a pH distribution of a single-walled carbon nanotube dispersion liquid which has been subjected to a separation operation in working example 1.

The results are shown in FIG. 4. In FIG. 4, a vertical axis indicates a pH of a single-walled carbon nanotube dispersion liquid and a horizontal axis indicates a fraction.

It was confirmed from the results of FIG. 4 that a pH of the single-walled carbon nanotube dispersion liquid increased from fraction F1 to fraction F15 so that the pH of the single-walled carbon nanotube dispersion liquid changed from an acidic dispersion liquid to an alkaline dispersion liquid.

Also, in the fractions F2 to F8 in the separation tank 101 on the second electrode 103 side (the lower part), a pH of the single-walled carbon nanotube dispersion liquid was 4 to 5. On the other hand, in the fractions F9 to F12 in the separation tank 101 on the first electrode 102 side (an upper part), a pH of the single-walled carbon nanotube dispersion liquid was 6 to 7. Furthermore, in the fractions F13 to F15 at the upper part, a pH was about 10.

The fraction F2 corresponds to a position in which the second electrode 103 is disposed and the fraction F14 corresponds to a position in which the first electrode 102 is disposed.

(Absorbance Measurement of Single-Walled Carbon Nanotube Dispersion Liquid)

Absorbance of single-walled carbon nanotube dispersion liquids recovered from the fraction F1, the fraction F4, the fraction F8, the fraction F11, and the fraction F14 was measured using a spectrophotometer (trade name: visible near-infrared spectrophotometer UV-3600; manufactured by Shimadzu Corporation).

Figure 5:
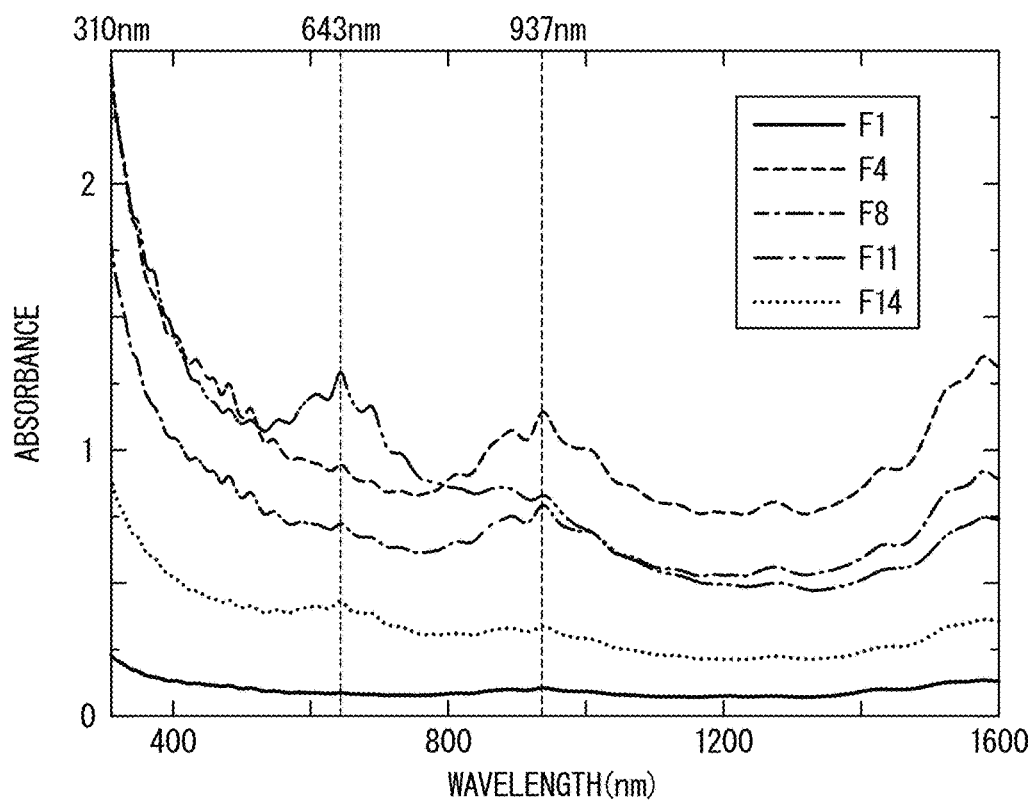
FIG. 5 is a diagram showing an absorption spectrum of a single-walled carbon nanotube dispersion liquid which has been subjected to a separation operation in working example 1.
Figure 6:
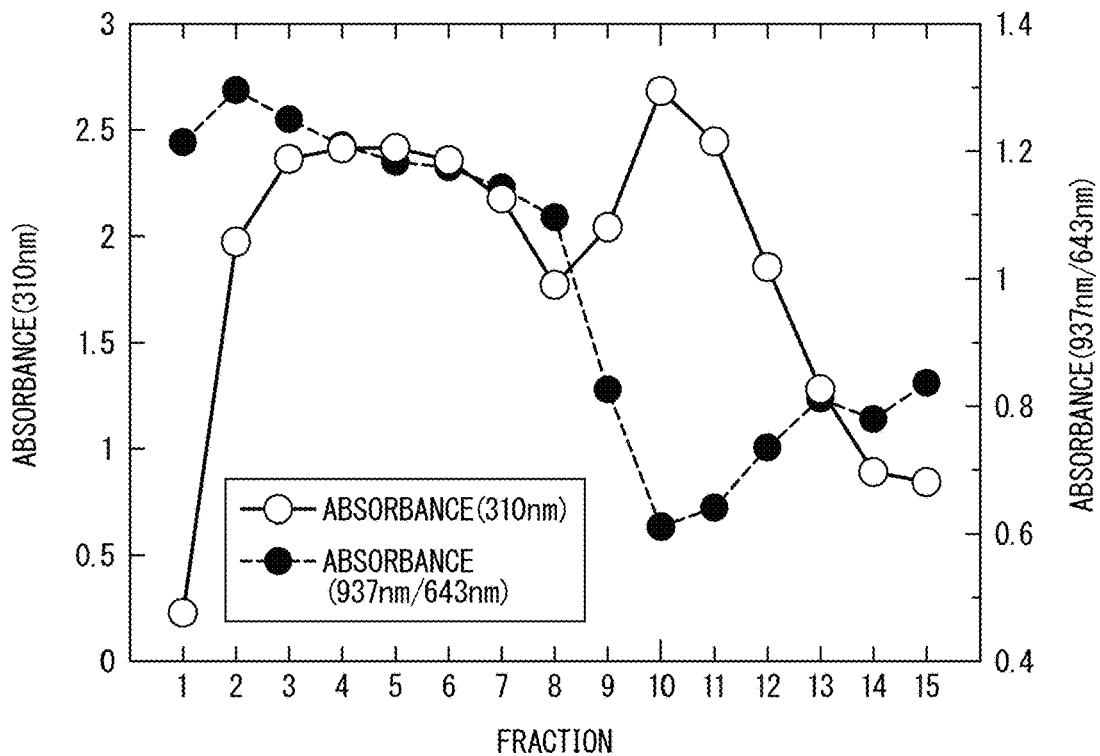
FIG. 6 is a diagram showing the absorbance of a single-walled carbon nanotube dispersion liquid which has been subjected to a separation operation in working example 1.

The results are shown in FIGS. 5 and 6.

In FIG. 5, a vertical axis indicates an absorbance of a single-walled carbon nanotube dispersion liquid and a horizontal axis indicates a wavelength. Furthermore, in FIG. 5, a peak at a wavelength of 643 nm is caused by a metallic type single-walled carbon nanotube and a peak at a wavelength of 937 nm is caused by a semiconductor type single-walled carbon nanotube.

From the results shown in FIG. 5, an absorbance spectrum of single-walled carbon nanotube dispersion liquids recovered from the fractions F1 and F14 had very small peaks at a wavelength of 643 nm and a wavelength of 937 nm. Therefore, it was confirmed that the fractions F1 and F14 contained almost no metallic type single-walled carbon nanotubes and semiconductor type single-walled carbon nanotubes.

In an absorbance spectrum of a single-walled carbon nanotube dispersion liquid recovered from the fractions F4 and F8, a peak at a wavelength of 643 nm was extremely small and a large peak at a wavelength of 937 nm was observed. Therefore, it was confirmed that the fractions F4 and F8 did not contain metallic type single-walled carbon nanotubes and contained a large amount of semiconductor type single-walled carbon nanotubes.

In an absorbance spectrum of a single-walled carbon nanotube dispersion liquid recovered from the fraction F11, a small peak at a wavelength of 937 nm and a large peak at a wavelength of 643 nm were observed. Therefore, it was confirmed that the fraction F11 contained almost no semiconductor type single-walled carbon nanotubes and contained a large amount of metallic type single-walled carbon nanotubes.

From the above results, the fractions F2 to F8 in which the pH of the single-walled carbon nanotube dispersion liquid was 4 to 5 contained the semiconductor type single-walled carbon nanotubes and the fractions F9 to F12 in which the pH of the single-walled carbon nanotube dispersion liquid was 6 to 7 contained the metallic type single-walled carbon nanotubes. That is to say, it was confirmed that these correspond to two regions having different pHs in the single-walled carbon nanotube dispersion liquid and were separated into the metallic type single-walled carbon nanotubes and the semiconductor type single-walled carbon nanotubes.

In FIG. 6, a left vertical axis indicates an absorbance of a single-walled carbon nanotube dispersion liquid at a wavelength of 310 nm, a right vertical axis indicates a value obtained by dividing an absorbance of a single-walled carbon nanotube dispersion liquid at a wavelength of 937 nm by an absorbance of a single-walled carbon nanotube dispersion liquid at a wavelength of 643 nm, and a horizontal axis indicates a fraction. That is to say, the right vertical axis in FIG. 6 corresponds to a purity of the semiconductor type single-walled carbon nanotubes. Furthermore, the absorbance of the single-walled carbon nanotube dispersion liquid at a wavelength of 310 nm corresponds to a concentration of the single-walled carbon nanotubes.

It was seen from the results shown in FIG. 6 that, since the absorbance of the single-walled carbon nanotube dispersion liquid at a wavelength of 310 nm increased in the fractions F2 to F8 and the fractions F9 to F12, the single-walled carbon nanotubes were separated into two regions inside the separation tank. Furthermore, it was seen that, since a value obtained by dividing an absorbance of a single-walled carbon nanotube dispersion liquid at a wavelength 937 nm by an absorbance of a single-walled carbon nanotube dispersion liquid at a wavelength of 643 nm increased in the fractions F2 to F8, this corresponds to semiconductor type single-walled carbon nanotubes having high purity. It was seen that, since a value obtained by dividing an absorbance of a single-walled carbon nanotube dispersion liquid at a wavelength of 937 nm by an absorbance of a single-walled carbon nanotube dispersion liquid at a wavelength of 643 nm decreased in the fractions F9 to F12, this corresponds to metallic type single-walled carbon nanotubes having high purity. In this way, it was confirmed that the metallic type single-walled carbon nanotubes and the semiconductor type single-walled carbon nanotubes having high purity were separated.

Working Example 2

In working example 2, instead of the single-walled carbon nanotube dispersion liquid in working example 1, a solution obtained by dissolving 1 wt % of polyoxyethylene (100) stearyl ether (trade name: Brij S100; manufactured by Sigma-Aldrich) which was a non-ionic surfactant in heavy water was prepared.

Subsequently, the solution was injected into a separation tank 101 in a nanocarbon separation apparatus 100 in the same manner as in working example 1.

Subsequently, a DC voltage of 120 V was applied to a first electrode 102 (a negative electrode) and a second electrode 103 (a positive electrode) of the nanocarbon separation apparatus 100. When a predetermined time has passed, application of the DC voltage to the first electrode 102 and the second electrode 103 was stopped.

After that, a rotary cock provided in an injection/recovery port 106 opened and a solution inside the separation tank 101 was gently recovered using a peristaltic pump. The solution was divided into 17 fractions for each about 6 mL in order of recovery. That is to say, the fractions were designated as F1, F2, . . . , and F17 from the second electrode 103 side (a lower part) of the separation tank 101.

Figure 7:
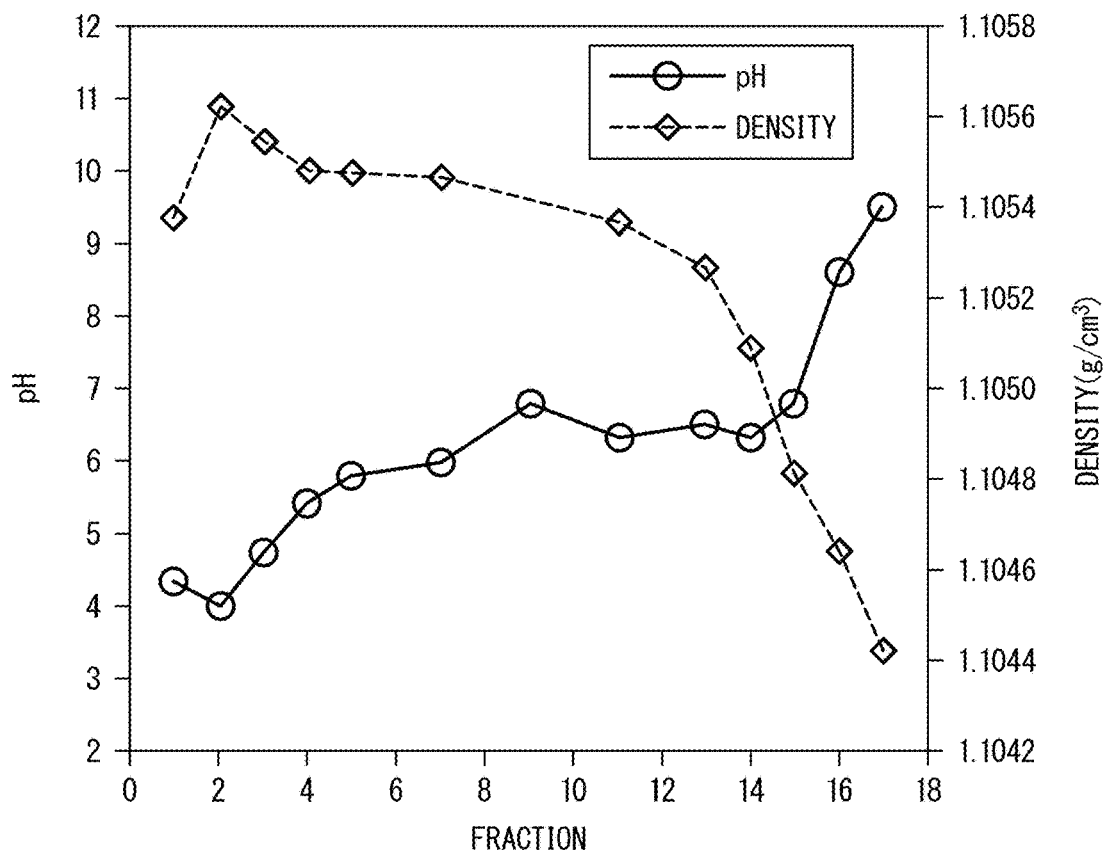
FIG. 7 is a diagram showing a pH and a density of a single-walled carbon nanotube dispersion liquid which has been subjected to a separation operation in working example 2.

A pH and a density of a heavy water solution of a surfactant recovered from each fraction were measured. The results are shown in FIG. 7. In FIG. 7, a left vertical axis indicates a pH of the heavy water solution of the recovered surfactant, a right vertical axis indicates a density of the heavy water solution of the recovered surfactant, and a horizontal axis indicates a fraction.

It was confirmed from the results shown in FIG. 7 that the pH of the heavy water solution of the surfactant increased from the fraction F1 to the fraction F17 so that the pH of the heavy water solution changed from an acidic pH to an alkaline pH. On the other hand, the density of the heavy water solution of the surfactant decreased from the fraction F1 to the fraction F17 toward the top of the separation tank 101. This indicates that, when an electric field was applied to the separation tank, the surfactant moved to the second electrode 103 which was a positive electrode and a concentration gradient of the surfactant is generated.

Therefore, it was suggested that, when the surfactant solution was input into the separation tank 101 of the nanocarbon separation apparatus 100 and a DC voltage of 120 V was applied to the first electrode 102 (a negative electrode) and the second electrode 103 (the positive electrode), the surfactant moves to the second electrode 103 which was the positive electrode, a concentration gradient of the surfactant was generated, and a pH gradient was formed.

Working Example 3

In working example 3, a solution obtained by dissolving 1 wt % of polyoxyethylene (100) stearyl ether (trade name: Brij S100; manufactured by Sigma-Aldrich) which is a non-ionic surfactant in water and water were prepared.

Subsequently, each of an aqueous 1% surfactant solution and water was injected into a separation tank 101 of a nanocarbon separation apparatus 100 and a DC voltage of 120 V was applied to a first electrode 102 (a negative electrode) and a second electrode 103 (a positive electrode) of the nanocarbon separation apparatus 100 in the same manner as in working example 1. When a predetermined time has passed, application of the DC voltage to the first electrode 102 and the second electrode 103 was stopped.

After that, a rotary cock provided in an injection/recovery port 106 opened and each of the aqueous 1% surfactant solution and water inside the separation tank 101 was gently recovered using a peristaltic pump.

Each of the aqueous 1% surfactant solution and water was divided into a plurality of fractions in order of recovery.

Figure 8:
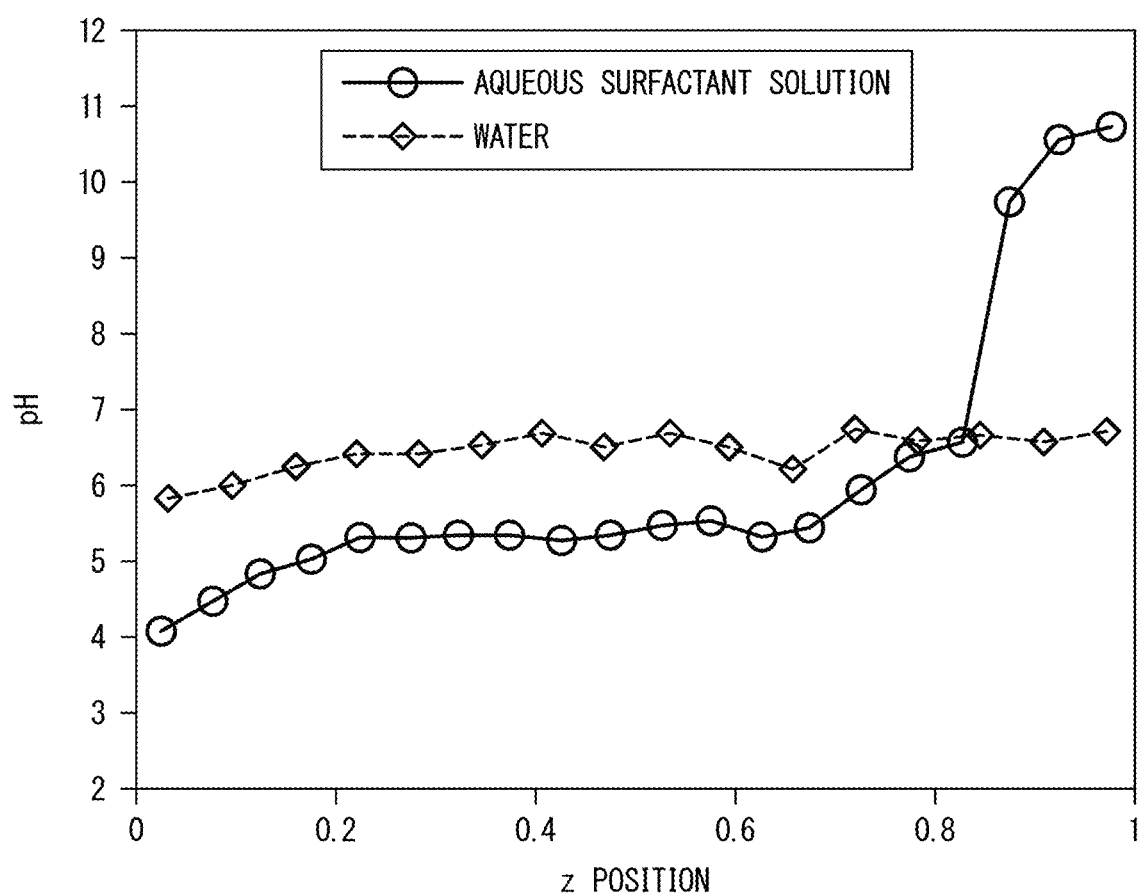
FIG. 8 is a diagram showing a pH after an aqueous surfactant solution and water have been subjected to an electrophoretic treatment in working example 3.

PHs of an aqueous surfactant solution recovered from each fraction and water were measured. The results are shown in FIG. 8. In FIG. 8, a vertical axis indicates a pH of the recovered aqueous surfactant solution or water and a horizontal axis indicates a relative Z position (a height) of the recovered fractions in the separation tank 101. That is to say, Z position 0 is the lowermost fraction and Z position 1 is the uppermost fraction.

It was seen from the results shown in FIG. 8 that the aqueous 1% surfactant solution had a gradient generated so that a pH thereof increased toward the top of the separation tank 101 in the same manner as in the heavy water solution of the surfactant in working example 2. On the other hand, it was seen that, in the case of water which did not contain a surfactant, a pH gradient is not formed. Therefore, it was seen that, in the separation method for the nanocarbons in the present invention, it was important that water or heavy water could be used as a solvent and a surfactant was contained to form a pH gradient.

Working Example 4

In working example 4, a solution obtained by dissolving 1 wt % of polyoxyethylene (100) stearyl ether (trade name: Brij S100; manufactured by Sigma-Aldrich) in water, a solution obtained by dissolving 2 wt % of polyoxyethylene (100) stearyl ether (trade name: Brij S100; manufactured by Sigma-Aldrich) which is a non-ionic surfactant in water, and water were prepared.

A rotary cock provided in an injection/recovery port 106 in a nanocarbon separation apparatus 100 opened and 15 mL of water was gently injected into the separation tank 101 having a volume of 100 mL using a peristaltic pump.

Subsequently, similarly, 70 mL of a 1% aqueous solution of polyoxyethylene (100) stearyl ether (trade name: Brij S100; manufactured by Sigma-Aldrich) was injected gently.

Also, similarly, 15 mL of a 2% aqueous solution of polyoxyethylene (100) stearyl ether (trade name: Brij S100; manufactured by Sigma-Aldrich) was injected gently.

Figure 9:
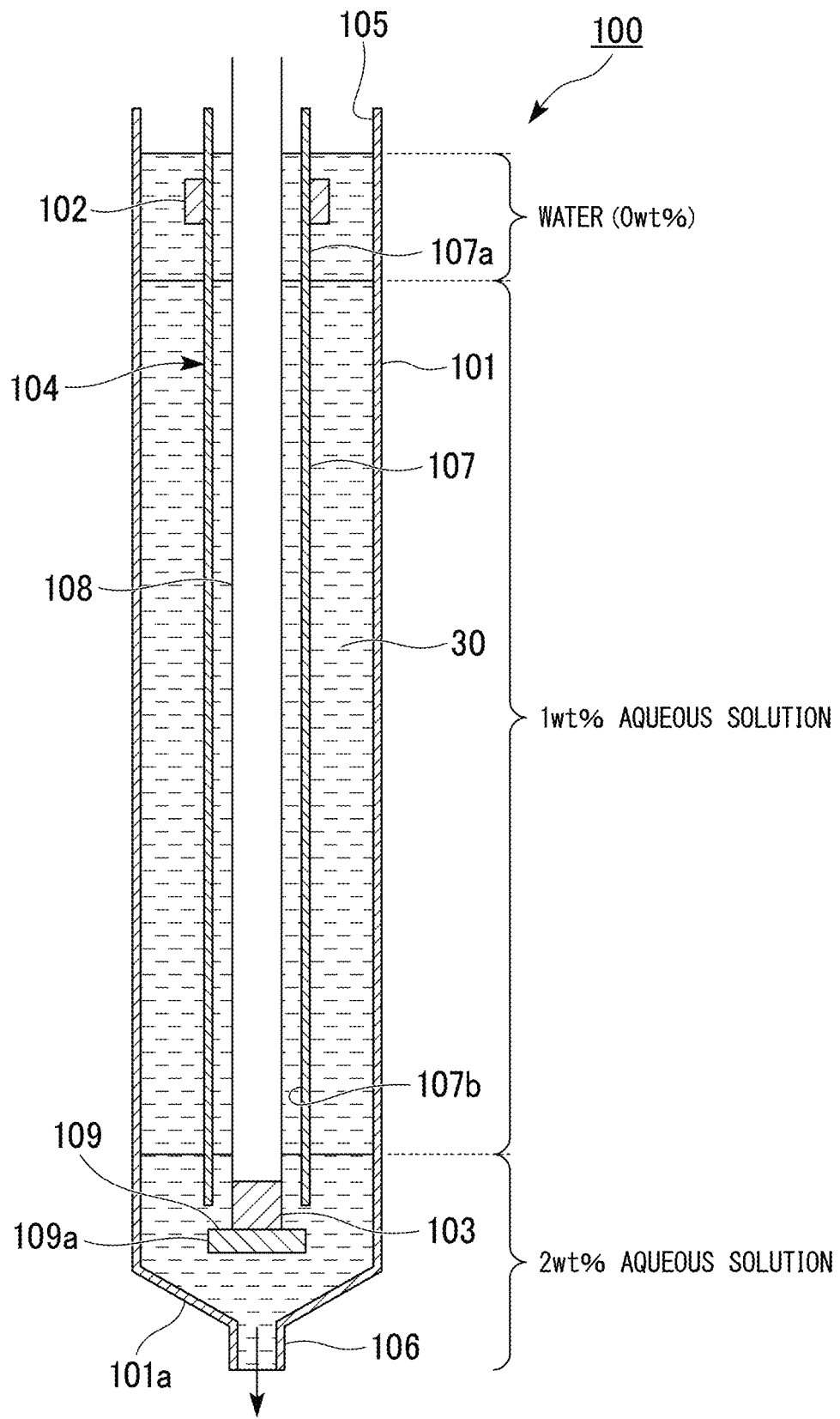
FIG. 9 is a diagram showing a layer structure of a solution in a separation tank in working example 4.

As a result, as shown in FIG. 9, a three-layered solution laminated structure, i.e., water in a region close to a first electrode 102 (a negative electrode), a 2% aqueous solution in a region close to a second electrode 103 (a positive electrode), and a 1% aqueous solution in an intermediate region, was formed.

Subsequently, a DC voltage of 120 V was applied to the first electrode 102 (the negative electrode) and the second electrode 103 (the positive electrode) in the same manner as in working example 1. When a predetermined time has passed, application of the DC voltage to the first electrode 102 and the second electrode 103 was stopped.

After that, the rotary cock provided in the injection/recovery port 106 opened and a solution inside the separation tank 101 was gently recovered using a peristaltic pump. The solution was divided into 20 fractions for each about 5 mL in order of recovery. That is to say, the fractions was designated as F1, F2, ..., and F20 from the second electrode 103 side (a lower part) of the separation tank 101.

Figure 10:
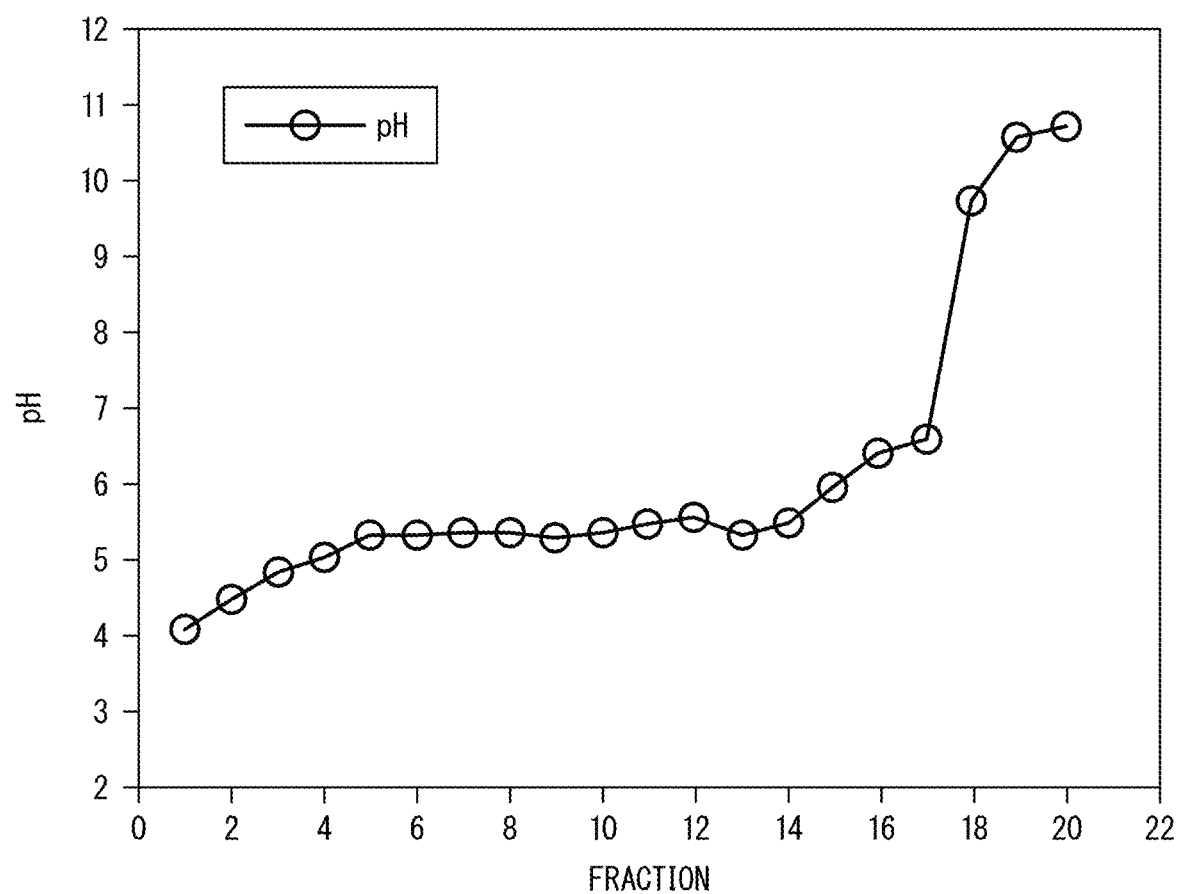
FIG. 10 is a diagram showing a pH distribution of an aqueous solution which has been subjected to a separation operation in working example 4.

PH of aqueous solution recovered from each of the fractions was measured. The results are shown in FIG. 10. In FIG. 10, a vertical axis indicates a pH of the recovered aqueous solution and a horizontal axis indicates a fraction. Also in this case, similarly, it was confirmed that a pH of an aqueous surfactant solution increased so that the pH thereof changed from an acidic pH to an alkaline pH from the fraction F1 to the fraction F20, that is, from the bottom to the top of the separation tank 101.

In working example 2, it was suggested that the surfactant moved to the second electrode 103 which is a positive electrode, a concentration gradient of the surfactant is generated, and as a result, a pH gradient was formed. However, in working example 4, it was seen that movement of the surfactant for forming a final pH gradient may be small. As shown in working example 1, when the nanocarbons were separated, metallic nanocarbons move in a negative electrode direction and semiconductor nanocarbons move in a positive electrode direction. Therefore, in order to improve separation efficiency, it is necessary that there is little movement of other flows and substances inside the separation tank 101. In this working example, movement of the surfactant for forming a pH gradient can decrease, which is effective in improving separation efficiency.

Working Example 5

In working example 5, solution AA obtained by dissolving 1 wt % of polyoxyethylene (100) stearyl ether (trade name: Brij S100; manufactured by Sigma-Aldrich) which is a non-ionic surfactant in heavy water was prepared.

A single-walled carbon nanotube mixture (eDIPS (enhanced Direct Injection Pyrolytic Synthesis, single-walled carbon nanotube; average diameter: 1.0 nm) was put into the solution AA.

The single-walled carbon nanotube mixture was dispersed by subjecting the solution AA having the single-walled carbon nanotube mixture put therein to ultrasonic dispersion treatment at an output of 40 W for 20 minutes using a horn type ultrasonic crusher (trade name: Digital Sonifier 450; manufactured by Branson Ultrasonics). After that, an ultracentrifugation operation was performed at 250000×g and 10° C. for 1 hour using an ultracentrifuge (trade name: CS100GXII; manufactured by Hitachi koki). Furthermore, a supernatant corresponding to 80% of the single-walled carbon nanotube mixture was fractionated and a single-walled carbon nanotube dispersion liquid in which the amount of a single-walled carbon nanotube was 20 μg/mL and the amount of polyoxyethylene (100) stearyl ether was 1.0 wt % was obtained.

Subsequently, solution BB obtained by dissolving 2 wt % of polyoxyethylene (100) stearyl ether (trade name: Brij S100; manufactured by Sigma-Aldrich) which is a non-ionic surfactant in heavy water was prepared.

15 mL of heavy water was gently injected into a separation tank having a volume of 100 mL through an injection/recovery port in a bottom portion of a nanocarbon separation apparatus using a peristaltic pump.

Subsequently, similarly, 70 mL of the prepared single-walled carbon nanotube dispersion liquid was gently injected.

Also, similarly, 10 mL of the solution BB prepared above was gently injected.

Figure 11:
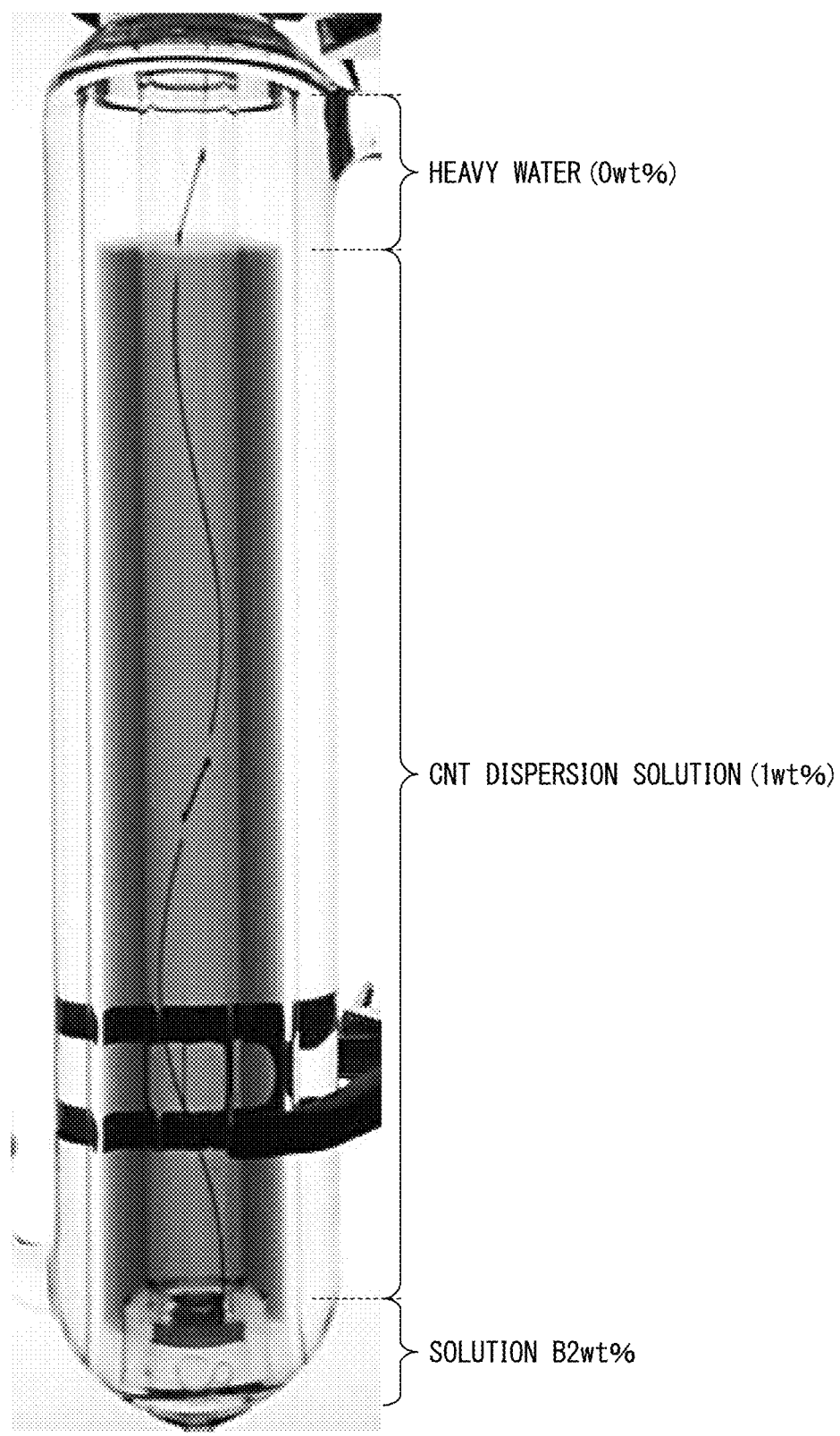
FIG. 11 is a diagram showing a layer structure of a solution which has not been subjected to a separation operation in a separation tank in working example 5.

As a result, as shown in FIG. 11, a three-layered solution laminated structure, i.e., heavy water in a region close to a first electrode (a negative electrode), solution BB (2 wt % of a heavy water solution) in a region close to a second electrode (a positive electrode), and a single-walled carbon nanotube dispersion liquid in an intermediate region was formed (the first electrode and the second electrode are unclear and thus difficult to distinguish in FIG. 11).

Figure 12:
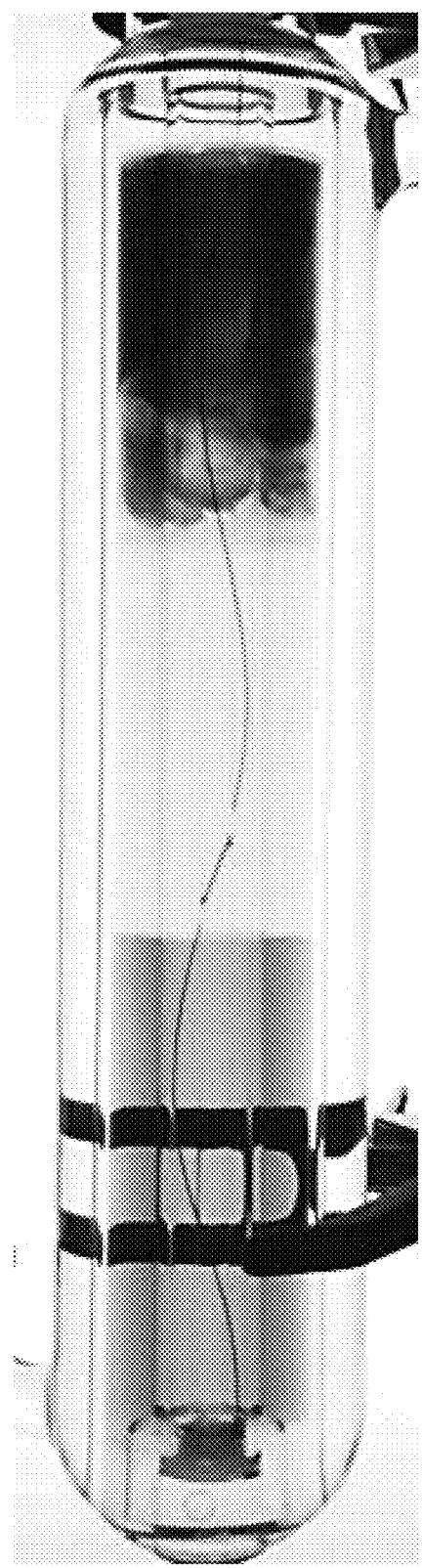
FIG. 12 is a diagram showing a layer structure of a solution which has been subjected to a separation operation in a separation tank in working example 5.

Subsequently, a DC voltage of 120 V was applied to the first electrode (the negative electrode) and the second electrode (the positive electrode) in the same manner as in working example 1. When a predetermined time has passed, as shown in FIG. 12, the single-walled carbon nanotube was separated into two upper and lower regions inside the separation tank and an intermediate layer having almost no color was formed between the two regions.

After the application of the DC voltage to the first electrode and the second electrode was stopped, the solution inside the separation tank was gently recovered through the injection/recovery port in the bottom portion of the nanocarbon separation apparatus using a peristaltic pump. The solution was divided into 15 fractions for each about 6 mL in order of recovery. That is to say, the fractions were designated as F1, F2, ..., and F15 in order from the lower part of the separation tank.

Figure 13:
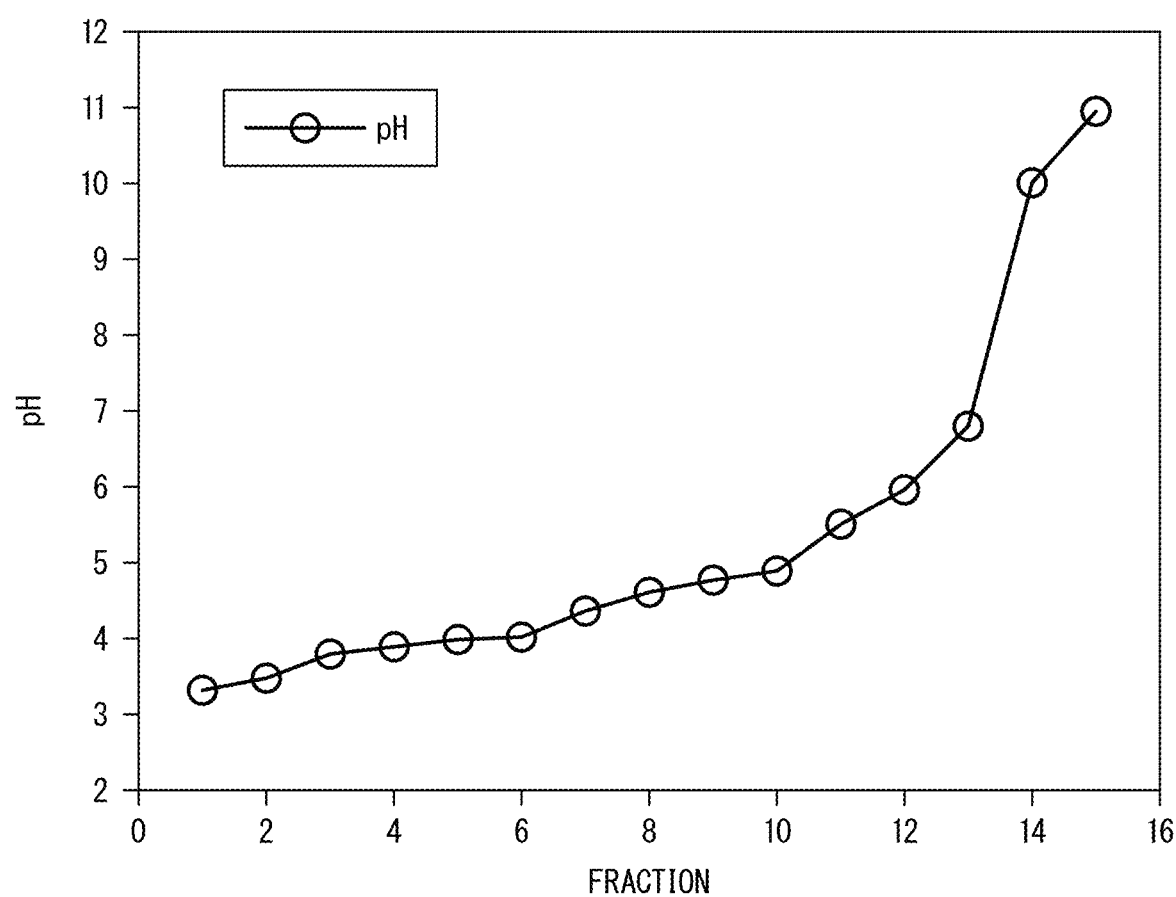
FIG. 13 is a diagram showing a pH of a solution which has been subjected to a separation operation in working example 5.

PH of aqueous solution recovered from each of the fractions was measured. The results were shown in FIG. 13. In FIG. 13, a vertical axis indicates a pH of the recovered aqueous solution and a horizontal axis indicates a fraction. Also in this case, similarly, a pH gradient was confirmed so that the pH gradient changed from an acidic pH to an alkaline pH from the fraction F1 to the fraction F15, that is, from the bottom to the top of the separation tank.

Figure 14:
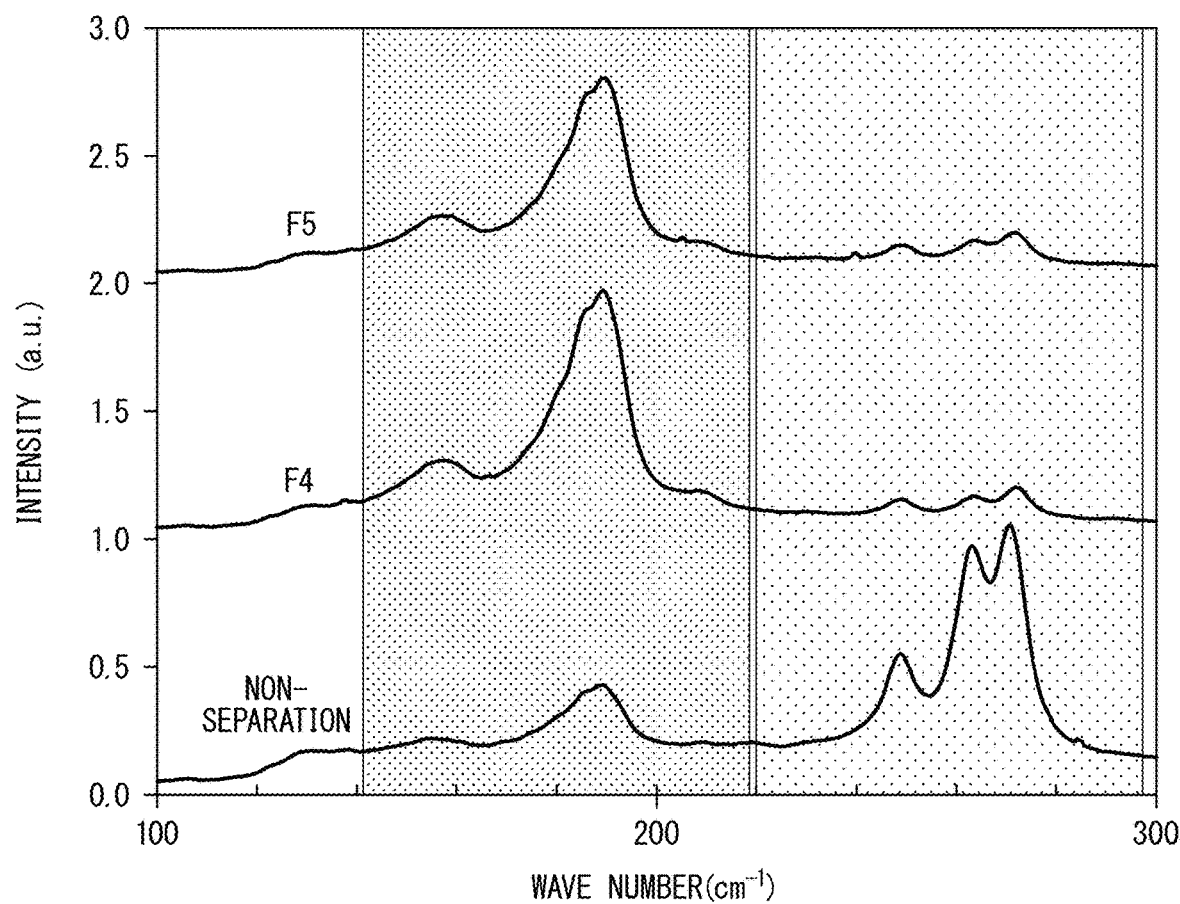
FIG. 14 is a diagram showing a Raman spectrum of a solution which has been subjected to a separation operation in working example 5.

Also, FIG. 14 shows a Raman spectrum of a radial breathing mode (RBM) region obtained by measuring a single-walled carbon nanotube dispersion liquid of the fractions F4 and F5 having a pH of about 4 and a single-walled carbon nanotube dispersion liquid (which is not separated) which is not subjected to a separation operation using a micro-Raman spectrometer (trade name: HR-800; manufactured by HORIBA). In FIG. 14, a vertical axis indicates a normalized intensity, a horizontal axis indicates a wave number, and an excitation wavelength at the time of measurement is 514 nm. In FIG. 14, a peak of a region with a wave number of 140 to 220 ($cm^{-1}$) is derived from a semiconductor type single-walled carbon nanotube and a peak of a region with a wave number of 220 to 300 ($cm^{-1}$) is derived from a metallic type single-walled carbon nanotube. It was seen that a single-walled carbon nanotube dispersion liquid (which is not separated) which is not subjected to a separation operation contains a large amount of metallic type single-walled carbon nanotubes, but in the fractions F4 and F5 having a pH of about 4, a peak derived from metallic type single-walled carbon nanotubes was very small and a peak derived from semiconductor type single-walled carbon nanotubes was large. By analyzing these peaks in detail, it was estimated that semiconductor type single-walled carbon nanotubes of the fractions F4 and F5 had a purity of about 98%.

The semiconductor type single-walled carbon nanotubes having high purity were obtained using the separation method for the nanocarbons of the present invention.

With regard to the working examples of the present invention, the working examples of a case in which, in the nanocarbon separation apparatus 100 shown in FIG. 3, the first electrode 102 provided at the upper part is a negative electrode, the second electrode 103 provided at the lower part is a positive electrode, and an upward electric field was provided inside the separation tank (the electrophoresis tank) 101 having an I-shaped structure have been described above. However, the nanocarbon separation method of the present invention is not limited thereto. In the nanocarbon separation apparatus 100, the first electrode 102 may be a positive electrode and the second electrode 103 may be a negative electrode. In this case, a direction of a pH gradient of the nanocarbon dispersion liquid 30 formed inside the separation tank 101 through carrier-free electrophoresis is opposite to that in the above working examples. At this time, a density gradient was also formed inside the separation tank 101 as shown in FIG. 7 in working example 2, but a specific gravity difference was about 0.001 (g/cm³). Therefore, nanocarbons can also be separated when an electric field was applied from top to bottom inside the separation tank 101.

However, in order to further maintain separation stability, it is more reasonable to use gravity. Therefore, in the separation method for the nanocarbons of the present invention, the effects of a case in which the first electrode 102 provided at the upper part was a negative electrode and the second electrode 103 provided at the lower part was a positive electrode inside the separation tank 101 and an upward electric field was provided were greater.

Also, similarly, in order to further use gravity, it is reasonable that the separation tank 101 has an I (vertical) shape. By providing an I (vertical) shape, it is possible to minimize disturbance due to convection or the like, separation of nanocarbons is stabilized, and it is possible to improve purity of separation.

INDUSTRIAL APPLICABILITY

The nanocarbon separation method of the present invention can improve separation efficiency when nanocarbons having different properties are separated. Alternatively, it is possible to shorten time required for separation when carbon nanohorns having different properties are separated.

REFERENCE SYMBOLS 10, 100 Nanocarbon separation apparatus
11, 101 Separation tank
12, 102 First electrode
13, 103 Second electrode
14 Injection port
15 First recovery port
16 Second recovery port
30 Nanocarbon dispersion liquid
104 Electrode member
105 Opening section
106 Injection/recovery port
107 Cylindrical member
108 Columnar member
109 Fitting member

The invention claimed is:

1. A nanocarbon separation method, comprising:
preparing a nanocarbon dispersion liquid in which a nanocarbon and a non-ionic surfactant are dispersed in a solvent;
injecting the nanocarbon dispersion liquid into a separation tank;
applying a direct current voltage to a first electrode provided at an upper part of the interior of the separation tank and a second electrode provided at a lower part of the interior of the separation tank and generating a pH gradient in the nanocarbon dispersion liquid inside the separation tank; and
separating metallic nanocarbons and semiconductor nanocarbons included in the nanocarbon dispersion liquid,
wherein an amount of the non-ionic surfactant in the nanocarbon dispersion liquid in the separation tank is 1 wt % or more and 5 wt % or less.

2. The nanocarbon separation method according to claim 1, wherein the non-ionic surfactant is a polyoxyethylene alkyl ether represented by the following expression:

where, n=12 to 18 and m=20 to 100.

3. The nanocarbon separation method according to claim 1, wherein, when the direct current voltage is applied, an electric field between the first electrode and the second electrode is 0.5 V/cm or higher and 15 V/cm or lower.

4. The nanocarbon separation method according to claim 1, wherein the separation tank has a vertical type structure.

5. The nanocarbon separation method according to claim 1, wherein the solvent is water or heavy water.

6. The nanocarbon separation method according to claim 1, wherein, in the injecting the nanocarbon dispersion liquid into the separation tank, a solvent or a solution including the non-ionic surfactant, the solvent or the solution having a specific gravity smaller than that of the nanocarbon dispersion liquid is injected into a region which comes in contact with the first electrode and a solution having a specific gravity greater than that of the nanocarbon dispersion liquid and including the non-ionic surfactant is injected into a region which comes in contact with the second electrode.

7. The nanocarbon separation method according to claim 1, wherein the nanocarbons are single-walled carbon nanotubes.

8. The nanocarbon separation method according to claim 1, wherein the first electrode is a negative electrode, the second electrode is a positive electrode, and a direction of an electric field generated when the direct current voltage is applied to the first electrode and the second electrode is upward in a height direction of the separation tank.

9. A nanocarbon separation apparatus used for separation of metallic nanocarbons and semiconductor nanocarbons included in a nanocarbon dispersion liquid in which nanocarbons and a non-ionic surfactant are dispersed in a solvent, the nanocarbon separation apparatus comprising:

a separation tank which is configured to accommodate the nanocarbon dispersion liquid; and electrode members disposed inside the separation tank, wherein the separation tank has a lower end having an injection/recovery port communicating with an outer bottom surface of the separation tank, the electrode member includes a cylindrical member, a columnar member inserted into the cylindrical member, a first electrode provided on an outer circumferential surface of an upper end portion of the cylindrical member and a second electrode provided on a lower end portion of the columnar member, the columnar member is capable of moving in a height direction of the separation tank in a state being inserted into the cylindrical member, a lower end of the columnar member includes a fitting member configured to inscribe in a lower end portion of the cylindrical member when the columnar member moves upward in the height direction of the separation tank, and wherein at least a part of the second electrode is arranged inside the cylindrical member.

10. The nanocarbon separation method according to claim 1, wherein the amount of the non-ionic surfactant in the nanocarbon dispersion liquid in the separation tank is 1 wt % or more and 2 wt % or less.

11. A nanocarbon separation method, comprising:

preparing a separation tank and an electrode member provided in the separation tank wherein the electrode member comprises a cylindrical member, a columnar member inserted into the cylindrical member, a first electrode provided on an outer circumferential surface of an upper part of the cylindrical member, a second electrode provided at a lower part of the columnar member, and wherein at least a part of the second electrode is arranged inside the cylindrical member;

preparing a nanocarbon dispersion liquid in which a nanocarbon and a non-ionic surfactant are dispersed in a solvent;

injecting the nanocarbon dispersion liquid into the separation tank;

applying a direct current voltage to the first electrode and the second electrode;

separating metallic nanocarbons and semiconductor nanocarbons included in the nanocarbon dispersion liquid.

12. The nanocarbon separation method according to claim 11, wherein the second electrode and the cylindrical member are provided such that air bubbles generated by electrolysis at the second electrode move upwad inside the cylindrical member.

* * * * *